(12) United States Patent
Chen et al.

(10) Patent No.: US 9,648,500 B2
(45) Date of Patent: May 9, 2017

(54) TECHNIQUES FOR ENABLING WIRELESS COMMUNICATIONS USING SUBFRAME STRUCTURES HAVING DIFFERENT SUBFRAME DURATIONS

(71) Applicant: QUALCOMM Incorporated, San Diego, CA (US)

(72) Inventors: Wanshi Chen, San Diego, CA (US); Durga Prasad Malladi, San Diego, CA (US); Peter Gaal, San Diego, CA (US); Tao Luo, San Diego, CA (US); Yongbin Wei, San Diego, CA (US); Naga Bhushan, San Diego, CA (US); Hao Xu, San Diego, CA (US); Tingfang Ji, San Diego, CA (US); Aleksandar Damnjanovic, Del Mar, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 14/334,151

(22) Filed: Jul. 17, 2014

(65) Prior Publication Data

US 2015/0098437 A1    Apr. 9, 2015

Related U.S. Application Data

(60) Provisional application No. 61/887,326, filed on Oct. 4, 2013.

(51) Int. Cl.
*H04W 16/14* (2009.01)
*H04W 72/04* (2009.01)
(Continued)

(52) U.S. Cl.
CPC ............ *H04W 16/14* (2013.01); *H04L 5/0044* (2013.01); *H04L 5/0073* (2013.01);
(Continued)

(58) Field of Classification Search
CPC ............. H04W 16/14; H04W 36/0022; H04W 76/026; H04L 27/0006
See application file for complete search history.

(56) References Cited

U.S. PATENT DOCUMENTS

2014/0029561 A1   1/2014  Kim et al.
2014/0036853 A1   2/2014  Kim et al.
(Continued)

FOREIGN PATENT DOCUMENTS

WO   WO-2012141462 A2   10/2012
WO   WO-2012141463 A2   10/2012
(Continued)

OTHER PUBLICATIONS

ISA/EPO, International Search Report and Written Opinion of the International Searching Authority, Int'l. App. No. PCT/US2014/057517, Dec. 11, 2014, European Patent Office, Rijswijk, NL 13 pgs.

(Continued)

*Primary Examiner* — Hoon J Chung
(74) *Attorney, Agent, or Firm* — Holland & Hart LLP

(57) ABSTRACT

Techniques are described for wireless communications. A first subframe structure having a first subframe duration for communicating in a first carrier may be determined. A second subframe structure having a second subframe duration for communicating in a second carrier may also be determined. At least the second subframe structure having the second subframe duration may be used to communicate with at least one node.

28 Claims, 25 Drawing Sheets

(51) Int. Cl.
*H04L 5/00* (2006.01)
*H04L 27/00* (2006.01)

(52) U.S. Cl.
CPC ........ *H04L 5/0007* (2013.01); *H04L 27/0006* (2013.01); *H04W 72/0446* (2013.01); *H04W 72/0453* (2013.01)

(56) References Cited

U.S. PATENT DOCUMENTS

2014/0036889 A1   2/2014   Kim et al.
2014/0112289 A1*  4/2014   Kim ..................... H04W 16/14
                                                         370/329

FOREIGN PATENT DOCUMENTS

WO    WO-2012144801 A2    10/2012
WO    WO 2013/006006 A2 *  1/2013    .............. H04B 7/26

OTHER PUBLICATIONS

IPEA/EPO, Second Written Opinion of the International Searching Authority, Int'l. App. No. PCT/US2014/057517, Sep. 11, 2015, European Patent Office, Rijswijk, NL 8 pgs.

\* cited by examiner

TECHNIQUES FOR ENABLING WIRELESS COMMUNICATIONS USING SUBFRAME STRUCTURES HAVING DIFFERENT SUBFRAME DURATIONS

CROSS REFERENCES

The present application for Patent claims priority to U.S. Provisional Patent Application No. 61/887,326 by Chen et al., entitled "Techniques for Enabling Wireless Communications Using Subframe Structures Having Different Subframe Durations," filed Oct. 4, 2013, assigned to the assignee hereof, and which is hereby incorporated by reference in its entirety.

FIELD OF THE DISCLOSURE

The present disclosure relates to wireless communications, and more particularly to techniques for communicating in different carriers using different subframe structures having different subframe durations.

DESCRIPTION OF RELATED ART

Wireless communications networks are widely deployed to provide various communication services such as voice, video, packet data, messaging, broadcast, and the like. These wireless networks may be multiple-access networks capable of supporting multiple users by sharing the available network resources.

A wireless communications network may include a number of access points. The access points of a cellular network may include a number of base stations, such as NodeBs (NBs) or evolved NodeBs (eNBs). The access points of a wireless local area network (WLAN) may include a number of WLAN access points, such as Wi-Fi nodes. Each access point may support communication for a number of user equipments (UEs) and may often communicate with multiple UEs at the same time. Similarly, each UE may communicate with a number of access points, and may sometimes communicate with multiple access points and/or access points employing different access technologies. An access point may communicate with a UE via downlink and uplink. The downlink (or forward link) refers to the communication link from the access point to the UE, and the uplink (or reverse link) refers to the communication link from the UE to the access point.

As cellular networks become more congested, operators are beginning to look at ways to increase capacity. One approach may include the use of a WLAN to offload some of the traffic and/or signaling of a cellular network. WLANs (or Wi-Fi networks) are attractive because, unlike cellular networks that operate in a licensed spectrum, Wi-Fi networks generally operate in an unlicensed spectrum. When devices that communicate using different protocols (e.g., cellular and WLAN protocols) share a spectrum, it may be useful to distinguish the signals transmitted by (or received from) different operators.

Current cellular protocols using a licensed radio frequency spectrum may use a subframe structure of a certain duration. Protocols using an unlicensed radio frequency spectrum may use a subframe structure of the same duration in order to maintain some commonality between the two protocols. There are various communication scenarios, however, where different subframe structures having different subframe durations may be useful for communications using a licensed radio frequency spectrum band and for communications using an unlicensed radio frequency spectrum band.

SUMMARY

The present disclosure generally relate to one or more improved methods and/or apparatuses for wireless communications. In one example, a method for wireless communications is described. In one configuration, a subframe structure having a first subframe duration for communicating in a first carrier may be determined. A second subframe structure having a second subframe duration for communicating in a second carrier may also be determined. At least the second subframe structure having the second subframe duration may be used to communicate with at least one node.

In some embodiments, the first carrier may be in a licensed radio frequency spectrum band and the second carrier may be in an unlicensed radio frequency spectrum band.

In some embodiments, a first channel may be transmitted in the first carrier using the first subframe duration, and a second channel may be transmitted in the second carrier using the second subframe duration.

In some embodiments, a first channel may be received in the first carrier using the first subframe duration, and a second channel may be received in the second carrier using the second subframe duration.

In some embodiments, a channel may be transmitted in the second carrier, to at least one user equipment, using the second subframe duration. The second subframe duration may be less than the first subframe duration.

In some embodiments, downlink resources of the channel may be assigned to the at least one user equipment based on two or more resource blocks (RBs) of the second subframe structure. In some cases, downlink demodulation reference signals (DL DM-RS) of the channel may be assigned based on two or more RBs of the second subframe structure. In some cases, channel state information reference signals (CSI-RS) of the channel may be assigned based on two or more RBs of the second subframe structure.

In some embodiments, resources may be allocated using at least a pair of adjacent RBs of the second subframe structure. The adjacent RBs of the second subframe structure may function together as a single RB of the first subframe structure. In some cases, a transport block size (TBS) determination for the second subframe structure may be adjusted with respect to the first subframe structure. In some cases, a sub-band size for channel state information (CSI) feedback for the second subframe structure may be adjusted with respect to the first subframe structure. In some cases, the sub-band size for CSI feedback may be adjusted to include a sub-band size of 16 RBs.

In some embodiments, resources may be allocated based on a single RB allocation of the second subframe structure; a number of assigned RBs may be multiplied by a factor that is based on the second subframe duration to produce an index; and the index may be used to perform a TBS determination.

In some embodiments, a control channel may be used to cross schedule component carriers (CCs) from subframes based on the first subframe structure to subframes based on the second subframe structure. The control channel may include a physical downlink control channel (PDCCH).

In some embodiments, scheduling of CCs of subframes having the second subframe structure may be performed. In some cases, the CCs of the subframes having the second subframe structure may be scheduled across subframes or scheduled for multiple subframes. In some cases, the scheduling of CCs may be performed using an enhanced physical downlink control channel (EPDCCH).

In some embodiments, acknowledgment/non-acknowledgement (ACK/NACK) feedback may be received, via an uplink subframe, for one or more downlink subframes. The one or more downlink subframes may be based on the second subframe structure.

In some cases, two or more downlink subframes based on the second subframe structure may be mapped to a single uplink subframe based on the first subframe structure for ACK/NACK feedback. In some cases, two or more downlink subframes based on the second subframe structure may be mapped to a single uplink subframe based on the second subframe structure for ACK/NACK feedback.

In some embodiments, a plurality of subframes of the second subframe structure may be scheduled using a single subframe of the first subframe structure.

In some embodiments, an indicator may be broadcast to indicate a subframe duration during a subsequent period of communications.

In some embodiments, downlink subframes having the second subframe duration may be transmitted in the second carrier.

In some embodiments, uplink subframes having the first subframe duration may be received in the first carrier.

In some embodiments, uplink subframes having the first subframe duration may be transmitted in the first carrier.

In some embodiments, downlink subframes having the second subframe duration may be received in the second carrier.

In some embodiments, a type of channel to be transmitted may be identified, and the channel may be transmitted in an uplink subframe using either the first subframe duration or the second subframe duration. The subframe duration used may be based at least in part on the identified channel type.

In some embodiments, at least one indication of whether at least one downlink channel or at least one uplink channel will be based on the first subframe structure having the first subframe duration or the second subframe structure having the second subframe duration may be received.

In some embodiments, a subframe duration of a downlink control channel may be detected, and a subframe duration of a downlink shared channel may be determined based at least in part on the subframe duration of the downlink control channel.

In some embodiments, ACK/NACK feedback may be transmitted for one or more downlink subframes of the second subframe structure.

In some embodiments, the first subframe duration may be one millisecond (ms).

In some embodiments, the second subframe duration may be 0.5 millisecond (ms).

In some embodiments, the at least one node may include a user equipment (UE) or an evolved Node B (eNB).

In some embodiments, a component carrier in the first carrier may be determined as a primary component carrier in a licensed spectrum, and at least one component carrier in the second carrier may be determined as a secondary component carrier in an unlicensed spectrum. In some cases, the second carrier in the unlicensed spectrum may operate as a supplemental downlink to the primary component carrier in the licensed spectrum. In some cases, the first carrier and the second carrier may be part of a carrier aggregation operation. In some cases, the component carrier in the first carrier and the at least one component carrier in the second carrier may be part of a dual-connectivity operation.

An apparatus for wireless communications is described. In one configuration, the apparatus may include a means for determining a first subframe structure having a first subframe duration for communicating in a first carrier; a means for determining a second subframe structure having a second subframe duration for communicating in a second carrier; and a means for communicating with at least one node using at least the second subframe structure having the second subframe duration.

Another apparatus for wireless communications is also described. In one configuration, the apparatus may include a processor, memory in electronic communication with the processor, and instructions stored in the memory. The instructions may be executable by the processor to determine a first subframe structure having a first subframe duration for communicating in a first carrier; determine a second subframe structure having a second subframe duration for communicating in a second carrier; and communicate with at least one node using at least the second subframe structure having the second subframe duration.

A computer program product for wireless communications is also described. In one configuration, the computer program product may include a non-transitory computer-readable medium. The non-transitory computer-readable medium may store instructions executable by a processor to determine a first subframe structure having a first subframe duration for communicating in a first carrier; determine a second subframe structure having a second subframe duration for communicating in a second carrier; and communicate with at least one node using at least the second subframe structure having the second subframe duration.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
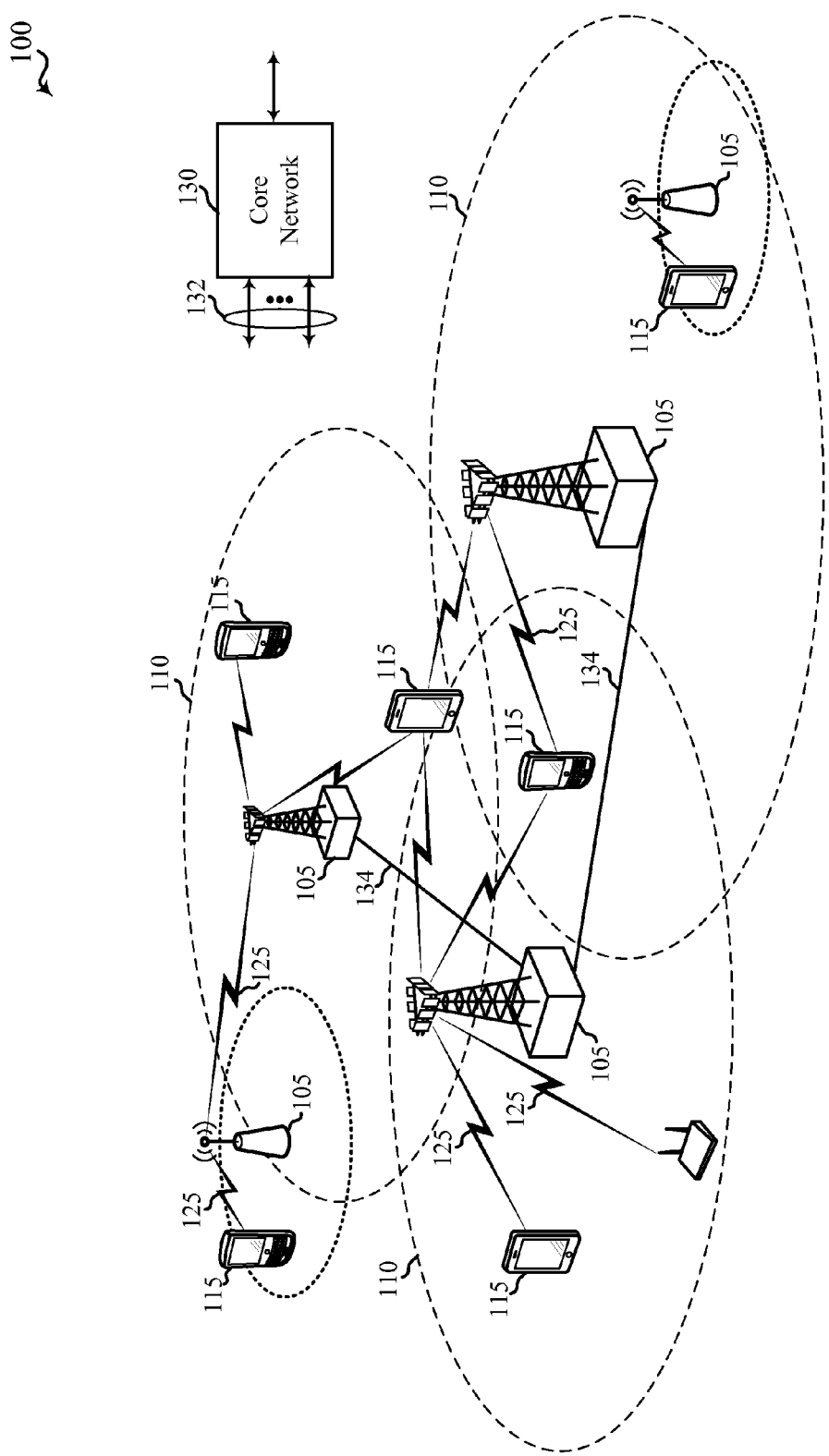
FIG. 1 shows a block diagram of a wireless communications system, in accordance with various aspects of the present disclosure.

Techniques are described for determining a structure of a subframe for wireless communications using licensed and unlicensed radio frequency spectrum bands. In a wireless communication system, such as Long Term Evolution (LTE), a licensed radio frequency spectrum band may be used. Channels may be transmitted in subframe structures of a certain duration (e.g., one millisecond (ms)). For LTE deploying the use of unlicensed radio frequency spectrum bands, unlicensed radio frequency spectrum bands may be used for wireless communications. For these deployments, a 1 ms based subframe structure may be used in order to maintain a commonality with LTE subframe structures. However, there are cases where subframe structure having a subframe duration of one millisecond in LTE deployments that use unlicensed radio frequency spectrum bands may not apply because the duration of the transmissions may be different than one millisecond.

In one example, for Clear Channel Assessment (CCA) Exempt Transmissions (CET), the duration may be less than one millisecond. For instance, for downlink (DL) CET, 4 symbols may be used for the transmissions. For uplink (UL) CET, 6 or 7 symbols may be used. In another example, for special subframes when a DL CCA or UL CCA is performed, the available duration for a DL or UL transmission may be less than 1 ms. DL CCA special subframes may include an UL transmission opportunity of 0.5 milliseconds. UL CCA special subframes may include a DL transmission opportunity of 4 symbols. Further, for radar detection, a duration of non-integer multiples of 1 ms may be applied for DL/UL transmissions. As a result, a subframe structure for communications according to LTE deployments of unlicensed radio frequency spectrum bands may be determined that is different than the subframe structure used for LTE communications.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 shows a block diagram of a wireless communications system 100, in accordance with various aspects of the present disclosure. The wireless communications system 100 includes a plurality of base stations (e.g., access points, eNBs, or WLAN access points) 105, a number of user equipments (UEs) 115, and a core network 130. Some of the base stations 105 may communicate with the UEs 115 under the control of a base station controller (not shown), which may be part of the core network 130 or certain base stations 105 (e.g., access points or eNBs) in various embodiments. Some of the base stations 105 may communicate control information and/or user data with the core network 130 through backhaul 132. In some embodiments, some of the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some embodiments, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station may be divided into sectors making up only a portion of the coverage area (not shown). The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some embodiments, the wireless communications system 100 may include an LTE/LTE-A communications system (or network), which LTE/LTE-A communications system may support one or more modes of operation or deployment scenarios. In other embodiments, the wireless communications system 100 may support wireless communications using an unlicensed spectrum and an access technology different from LTE deploying an unlicensed radio frequency spectrum band, or a licensed spectrum and an access technology different from LTE/LTE-A. In LTE/LTE-A communications systems, the term evolved NodeB or eNB may be generally used to describe of the base stations 105. The wireless communications system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1 application protocol, etc.). The eNBs 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different access networks, such as cellular or other WWAN access networks, or WLAN access networks.

The communications links 125 shown in wireless communications system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions. The downlink transmissions may be made using a licensed spectrum (e.g., LTE), an unlicensed spectrum, or both. Similarly, the uplink transmissions may be made using a licensed spectrum (e.g., LTE), an unlicensed spectrum, or both.

In some embodiments of the wireless communications system 100, various deployment scenarios may be supported, including a supplemental downlink mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations or eNBs 105 as well as UEs 115 may support one or more of these or similar modes of operation. OFDMA communications signals may be used in the communications links 125 for LTE downlink transmissions in an unlicensed and/or a licensed spectrum, while SC-FDMA communications signals may be used in the communications links 125 for LTE uplink transmissions in an unlicensed and/or a licensed spectrum.

Figure 2A:
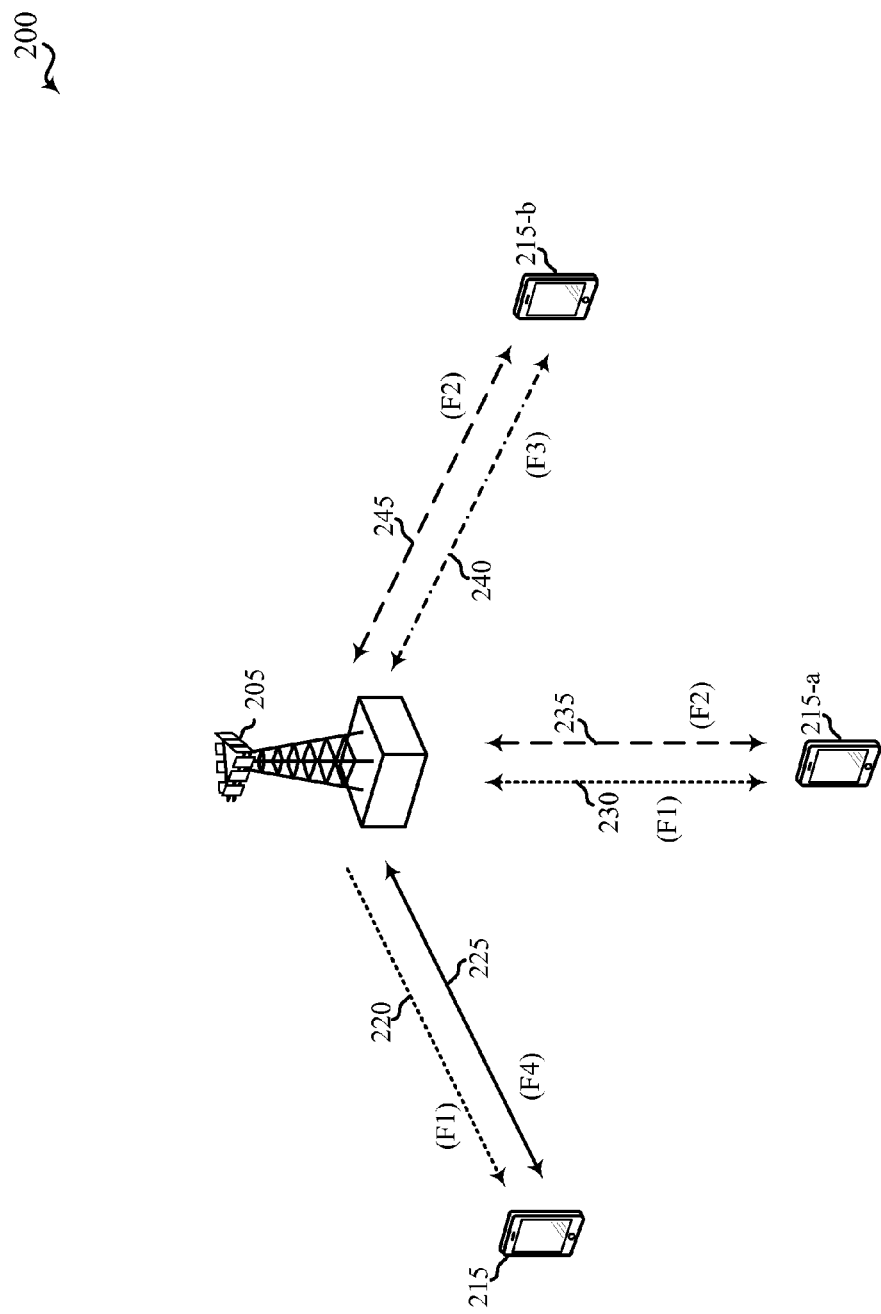
FIG. 2A shows a diagram that illustrates examples of deployment scenarios for using long term evolution (LTE) in an unlicensed spectrum, in accordance with various aspects of the present disclosure.

FIG. 2A shows a diagram that illustrates examples of deployment scenarios for using LTE in an unlicensed spectrum, in accordance with various aspects of the present disclosure. In one embodiment, FIG. 2A illustrates a wireless communications system 200 illustrating examples of a supplemental downlink mode and a carrier aggregation mode for an LTE network that supports communications in an unlicensed radio frequency spectrum band. The wireless communications system 200 may be an example of portions of the wireless communications system 100 of FIG. 1. Moreover, the base station 205 may be an example of the base stations 105 of FIG. 1, while the UEs 215, 215-a, and 215-b may be examples of the UEs 115 of FIG. 1.

In the example of a supplemental downlink mode in the wireless communications system 200, the base station 205 may transmit OFDMA communications signals to a UE 215 using a downlink 220. The downlink 220 may be associated with a frequency F1 in an unlicensed spectrum. The base station 205 may transmit OFDMA communications signals to the same UE 215 using a bidirectional link 225 and may receive SC-FDMA communications signals from that UE 215 using the bidirectional link 225. The bidirectional link 225 may be associated with a frequency F4 in a licensed spectrum. The downlink 220 in the unlicensed spectrum and the bidirectional link 225 in the licensed spectrum may operate concurrently. The downlink 220 may provide a downlink capacity offload for the base station 205. In some embodiments, the downlink 220 may be used for unicast services (e.g., addressed to one UE) services or for multicast services (e.g., addressed to several UEs). This scenario may occur with any service provider (e.g., traditional mobile network operator (MNO)) that uses a licensed spectrum and needs to relieve some of the traffic and/or signaling congestion.

In one example of a carrier aggregation mode in the wireless communications system 200, the base station 205 may transmit OFDMA communications signals to a UE 215-a using a bidirectional link 230 and may receive SC-FDMA communications signals from the same UE 215-a using the bidirectional link 230. The bidirectional link 230 may be associated with the frequency F1 in the unlicensed spectrum. The base station 205 may also transmit OFDMA communications signals to the same UE 215-a using a bidirectional link 235 and may receive SC-FDMA communications signals from the same UE 215-a using the bidirectional link 235. The bidirectional link 235 may be associated with a frequency F2 in a licensed spectrum. The bidirectional link 230 may provide a downlink and uplink capacity offload for the base station 205. Like the supplemental downlink described above, this scenario may occur with any service provider (e.g., MNO) that uses a licensed spectrum and needs to relieve some of the traffic and/or signaling congestion.

In another example of a carrier aggregation mode in the wireless communication system 200, the base station 205 may transmit OFDMA communications signals to a UE 215-b using a bidirectional link 240 and may receive SC-FDMA communications signals from the same UE 215-b using the bidirectional link 240. The bidirectional link 240 may be associated with a frequency F3 in an unlicensed spectrum. The base station 205 may also transmit OFDMA communications signals to the same UE 215-b using a bidirectional link 245 and may receive SC-FDMA communications signals from the same UE 215-b using the bidirectional link 245. The bidirectional link 245 may be associated with the frequency F2 in the licensed spectrum. The bidirectional link 240 may provide a downlink and uplink capacity offload for the base station 205. This example and those provided above are presented for illustrative purposes and there may be other similar modes of operation or deployment scenarios for capacity offload.

As described above, the typical service provider that may benefit from the capacity offload offered by using LTE deploying an unlicensed radio frequency spectrum band is a traditional MNO with an LTE spectrum. For these service providers, an operational configuration may include a bootstrapped mode (e.g., supplemental downlink, carrier aggregation) that uses an LTE primary component carrier (PCC) on a licensed spectrum and an unlicensed radio frequency spectrum band secondary component carrier (SCC) on an unlicensed spectrum.

In the carrier aggregation mode, data and control may generally be communicated in LTE (e.g., bidirectional links 225, 235, and 245) while data may generally be communicated in LTE deploying unlicensed radio frequency spectrum bands (e.g., bidirectional links 230 and 240). The carrier aggregation mechanisms supported may fall under a hybrid frequency division duplexing-time division duplexing (FDD-TDD) carrier aggregation or a TDD-TDD carrier aggregation with different symmetry across component carriers.

Figure 2B:
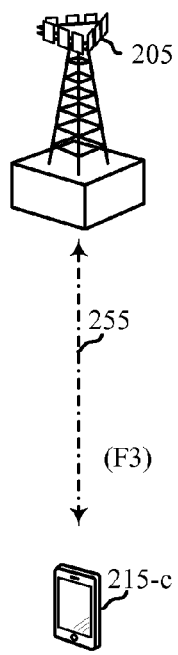
FIG. 2B shows a wireless communication system that illustrates an example of a standalone mode for LTE deploying an unlicensed radio frequency spectrum band, in accordance with various aspects of the present disclosure.

FIG. 2B shows a wireless communications system 250 that illustrates an example of a standalone mode for LTE deploying unlicensed radio frequency spectrum band, in accordance with various aspects of the present disclosure. The wireless communications system 250 may be an example of portions of the wireless communication system 100 of FIG. 1 and/or 200 of FIG. 2A. Moreover, the base station 205 may be an example of the base stations 105 and/or 205 described with reference to FIGS. 1 and/or 2A, while the UE 215-c may be an example of the UEs 115 and/or 215 of FIGS. 1 and/or 2A.

In the example of a standalone mode in the wireless communications system 250, the base station 205 may transmit OFDMA communications signals to the UE 215-c using a bidirectional link 255 and may receive SC-FDMA communications signals from the UE 215-c using the bidirectional link 255. The bidirectional link 255 may be associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event host, hotel, enterprise, or large corporation that does not have a licensed spectrum.

In some embodiments, a transmitting apparatus such as an eNB 105 and/or base station 205 described with reference to FIGS. 1, 2A, and/or 2B, or a UE 115 and/or 215 described with reference to FIGS. 1, 2A, and/or 2B, may use a gating interval to gain access to a channel of the shared spectrum (e.g., to a physical channel of the licensed or unlicensed spectrum). The gating interval may define an application of a contention-based protocol, such as a Listen Before Talk (LBT) protocol based on the LBT protocol specified in ETSI (EN 301 893). When using a gating interval that defines the application of an LBT protocol, the gating interval may indicate when a transmitting apparatus needs to perform a Clear Channel Assessment (CCA). The outcome of the CCA may indicate to the transmitting apparatus whether a channel of the shared unlicensed spectrum is available or in use. When the CCA indicates that the channel is available (e.g., "clear" for use), the gating interval may allow the transmitting apparatus to use the channel—typically for a predefined transmission interval. When the CCA indicates that the channel is not available (e.g., in use or reserved), the gating interval may prevent the transmitting apparatus from using the channel during the transmission interval.

Figure 4:
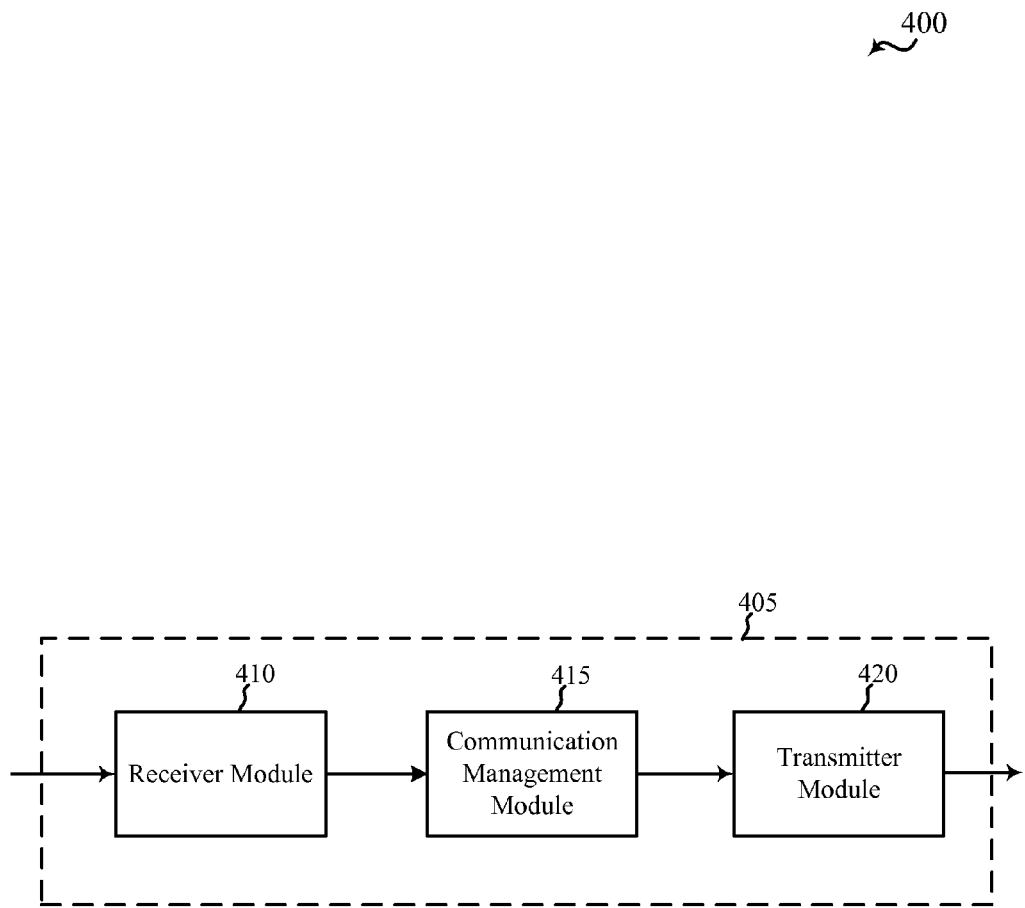
FIG. 4 shows a block diagram illustrating an apparatus for use in wireless communications, in accordance with various aspects of the present disclosure.

In some cases, it may be useful for a transmitting apparatus to generate a gating interval on a periodic basis and synchronize at least one boundary of the gating interval with at least one boundary of a periodic frame structure. For example, it may be useful to generate a periodic gating interval for a cellular downlink in a shared spectrum, and to synchronize at least one boundary of the periodic gating interval with at least one boundary of a periodic frame structure (e.g., LTE/LTE-A radio frame) associated with the cellular downlink. Examples of such synchronization are shown in FIG. 4.

Figure 3:
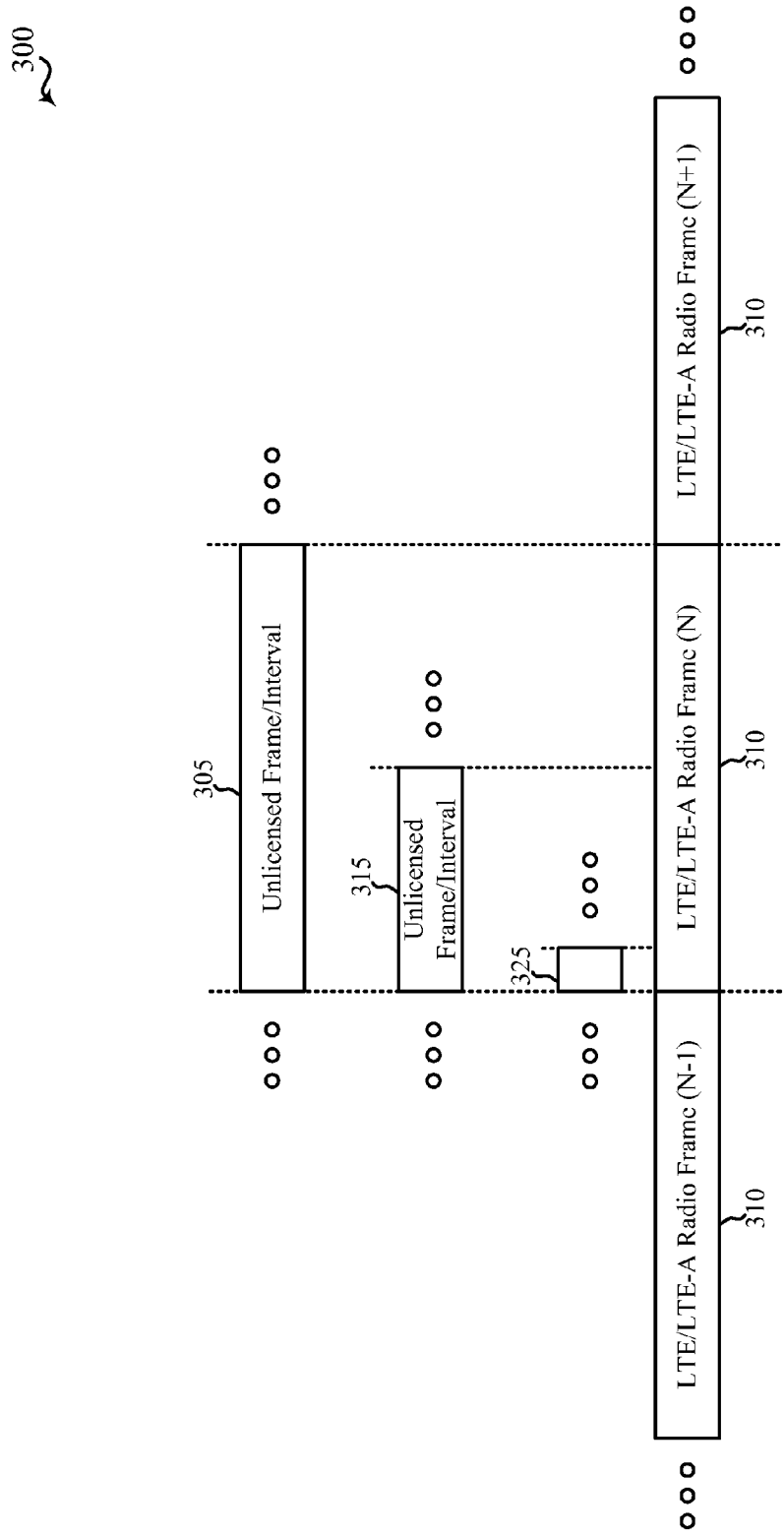
FIG. 3 illustrates examples of an unlicensed frame/interval for a cellular downlink in an unlicensed spectrum, in accordance with various aspects of the present disclosure.

FIG. 3 illustrates examples 300 of an unlicensed frame/interval 305, 315, and/or 325 for a cellular downlink in an unlicensed spectrum, in accordance with various aspects of the present disclosure. The unlicensed frame/interval 305, 315, and/or 325 may be used as a periodic gating interval by an eNB that supports transmissions over the unlicensed spectrum. Examples of such an eNB may be the base stations 105 and/or 205 described with reference to FIGS. 1, 2A, and/or 2B. The unlicensed frame/interval 305, 315, and/or 325 may be used with the wireless communications system 100, 200, and/or 250 described with reference to FIGS. 1, 2A, and/or 2B.

By way of example, the duration of the unlicensed frame/interval 305 is shown to be equal to (or approximately equal to) a duration of an LTE/LTE-A radio frame 310 of a periodic frame structure associated with a cellular downlink. In some embodiments, "approximately equal" means the duration of the unlicensed frame/interval 305 is within a cyclic prefix (CP) duration of the duration of the periodic frame structure.

At least one boundary of the unlicensed frame/interval 305 may be synchronized with at least one boundary of the periodic frame structure that includes the LTE/LTE-A radio frames N−1 to N+1. In some cases, the unlicensed frame/interval 305 may have boundaries that are aligned with the frame boundaries of the periodic frame structure. In other cases, the unlicensed frame/interval 305 may have boundaries that are synchronized with, but offset from, the frame boundaries of the periodic frame structure. For example, the boundaries of the unlicensed frame/interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the unlicensed frame/interval 305 may also have a duration of ten milliseconds. In these cases, the boundaries of the unlicensed frame/interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the duration of the unlicensed frames/intervals 315 and 325 are shown to be sub-multiples of (or approximate sub-multiples of) the duration of the periodic frame structure associated with the cellular downlink. In some embodiments, an "approximate sub-multiple of" means the duration of the unlicensed frame/interval 315, 325 is within a cyclic prefix (CP) duration of the duration of a sub-multiple of (e.g., half or one-tenth) the periodic frame structure. For example, the unlicensed frame/interval 315 may have a duration of five milliseconds and the unlicensed frame/interval 325 may have a duration of 1 or 2 milliseconds.

FIG. 4 shows a block diagram 400 illustrating an apparatus 405 for use in wireless communications, in accordance with various aspects of the present disclosure. In some embodiments, the 405 may be an example of one or more aspects of one or more of the base stations 105 and/or 205 or UEs 115 and/or 215 described with reference to FIGS. 1, 2A, and/or 2B. The apparatus 405 may also be a processor. The apparatus 405 may include a receiver module 410, a communication management module 415, and/or a transmitter module 420. Each of these components may be in communication with each other.

The components of the apparatus 405 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 410 may be or include a radio frequency (RF) receiver, such as an RF receiver operable to receive transmissions in a first carrier and/or a second carrier. In some cases, the first carrier may be in a licensed radio frequency spectrum band (e.g., an LTE/LTE-A radio frequency spectrum band) and/or the second carrier may be in an unlicensed radio frequency spectrum band. The receiver module 410 may be used to receive various types of data and/or control signals (i.e., transmissions) over one or more communication links (e.g., physical channels) of a wireless communications system including the first carrier and/or the second carrier, such as one or more communication links of the wireless communications system 100, 200, and/or 250 described with reference to FIGS. 1, 2A, and/or 2B.

In some embodiments, the transmitter module 420 may be or include an RF transmitter, such as an RF transmitter operable to transmit in the first carrier and/or the second carrier. The transmitter module 420 may be used to transmit various types of data and/or control signals (i.e., transmissions) over one or more communication links (e.g., physical channels) of a wireless communications system, such as one or more communication links of the wireless communications system 100, 200, and/or 250 described with reference to FIGS. 1, 2A, and/or 2B.

In some embodiments, the communication management module 415 may be used to manage wireless communications over the first carrier and/or the second carrier. For example, the communication management module 415 may be used to manage wireless communications in a supplemental downlink mode, in a carrier aggregation mode, and/or in a standalone mode of operation in the second carrier, which second carrier may be in an LTE network deploying an unlicensed radio frequency spectrum band.

In some embodiments, the communication management module 415 may transmit or receive channels in one or both of the first carrier and the second carrier using subframe structures having different subframe durations.

Figure 5:
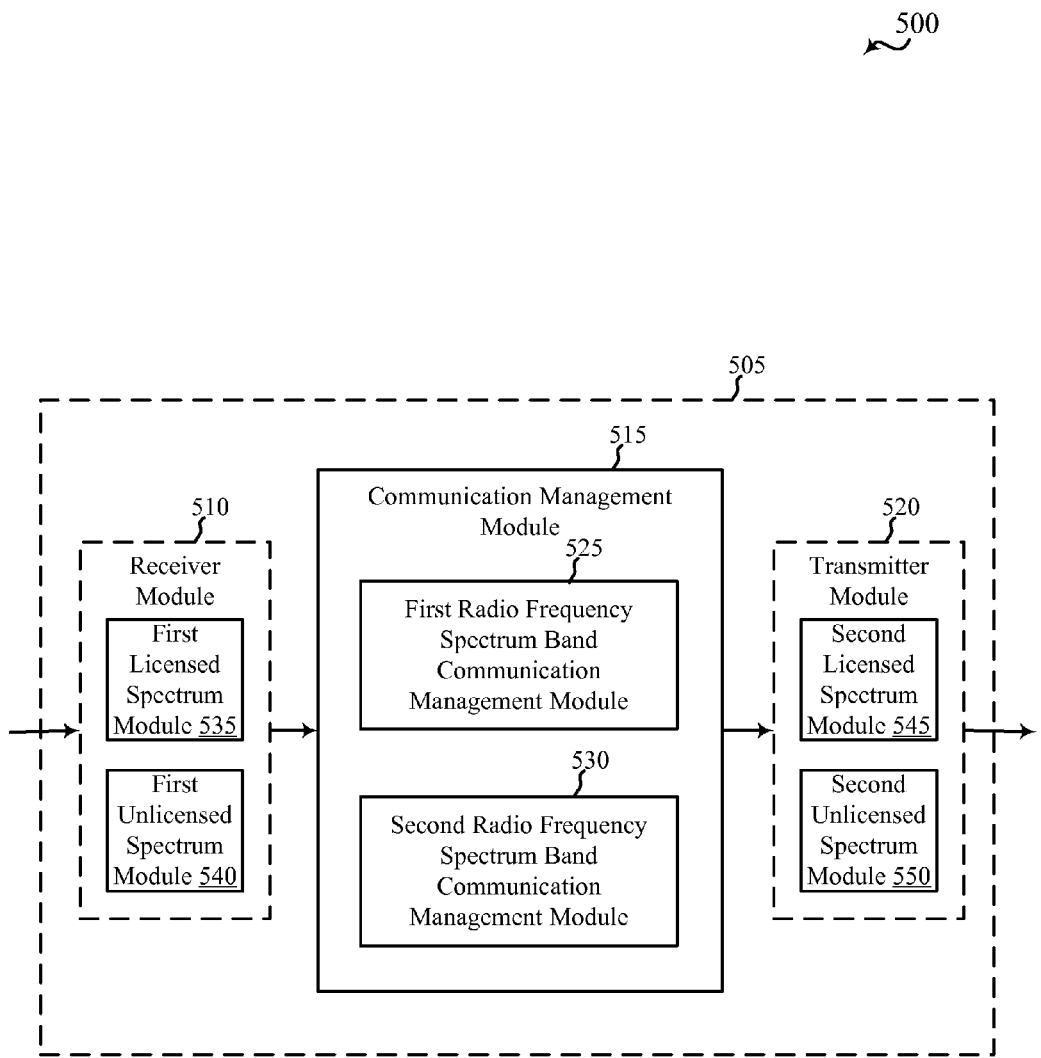
FIG. 5 shows a block diagram illustrating an apparatus for use in wireless communications, in accordance with various aspects of the present disclosure.

FIG. 5 shows a block diagram 500 illustrating an apparatus 505 for use in wireless communications, in accordance with various aspects of the present disclosure. In some embodiments, the apparatus 505 may be an example of one or more aspects of one or more of the apparatus 405 described with reference to FIG. 4, the base stations 105 and/or 205 described with reference to FIGS. 1, 2A, and/or 2B, or the UEs 115 and/or 215 described with reference to FIGS. 1, 2A, and/or 2B. The apparatus 505 may also be a processor. The apparatus 505 may include a receiver module 510, a communication management module 515, and/or a transmitter module 520. Each of these components may be in communication with each other.

The components of the apparatus 505 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver module 510 may be or include an RF receiver, such as an RF receiver operable to receive transmissions in a first carrier and/or a second carrier. In some cases, the first carrier may be in a licensed radio frequency spectrum band (e.g., an LTE/LTE-A radio frequency spectrum band) and/or the second carrier may be in an unlicensed radio frequency spectrum band. The RF receiver may include separate receivers for the first carrier and the second carrier. The separate receivers may in some cases take the form of a first licensed spectrum module 535 for communicating over the first carrier, and a first unlicensed spectrum module 540 for communicating over the second carrier. The receiver module 510, including the first licensed spectrum module 535 and/or the first unlicensed spectrum module 540, may be used to receive various types of data and/or control signals (i.e., transmissions) over one or more communication links (e.g., physical channels) of a wireless communications system, such as one or more communication links of the wireless communications system 100, 200, and/or 250 described with reference to FIGS. 1, 2A, and/or 2B.

In some embodiments, the transmitter module 520 may be or include an RF transmitter, such as an RF transmitter operable to transmit in the first carrier and/or the second carrier. The RF transmitter may include separate transmitters for the first carrier and the second carrier. The separate transmitters may in some cases take the form of a second licensed spectrum module 545 for communicating over the first carrier, and a second unlicensed spectrum module 550 for communicating over the second carrier. The transmitter module 520, including the second licensed spectrum module 545 and/or the second unlicensed spectrum module 550, may be used to transmit various types of data and/or control signals (i.e., transmissions) over one or more communication links (e.g., physical channels) of a wireless communications system, such as one or more communication links of the wireless communications system 100, 200, and/or 250 described with reference to FIGS. 1, 2A, and/or 2B.

In some embodiments, the communication management module 515 may be an example of one or more aspects of the communication management module 415 described with reference to FIG. 4 and may include a first radio frequency spectrum band communication management module 525 and/or a second radio frequency spectrum band communication management module 530.

In some embodiments, the first radio frequency spectrum band communication management module 525 may be used to determine a first subframe structure having a first subframe duration for communicating in the first carrier.

In some embodiments, the second radio frequency spectrum band communication management module 530 may be used to determine a second subframe structure having a second subframe duration for communicating in the second carrier.

In some cases, the apparatus 505 may communicate with at least one node (e.g., an eNB, UE, or other apparatus) in the first frequency spectrum band using the first subframe structure having the first subframe duration. The apparatus 505 may also communicate with the same at least one node (or a different at least one node) in the second frequency spectrum band using the second subframe structure having the second subframe duration. Communication in the first frequency spectrum band and the second frequency spectrum band may occur alternately or simultaneously. In some cases, the apparatus 505 may also communicate with at least one node in the first frequency spectrum band using the second subframe structure having the second subframe duration (or using another subframe structure having the second subframe duration). The apparatus 505 may also, in some cases, communicate with at least one node in the second frequency spectrum band using the first subframe structure having the first subframe duration (or using another subframe structure having the first subframe duration).

In some embodiments, the second subframe duration may be less than the first subframe duration. For example, the first subframe duration may be a one millisecond subframe duration, and the second subframe duration may be a 0.5 millisecond subframe duration. In some cases, a number of downlink subframes may be transmitted (e.g., from an eNB to a UE) or received (e.g., at the UE from the eNB) using the second subframe structure having the second subframe duration, and a number of uplink subframes may be transmitted (e.g., from the UE to the eNB) or received (e.g., at the eNB from the UE) using the first subframe structure having the first subframe duration, with the second subframe duration being less than the first subframe duration. The number of downlink subframes may be transmitted or received using the first radio frequency spectrum band communication management module 525, and the number of uplink subframes may be transmitted or received using the second radio frequency spectrum band communication management module 530.

In some embodiments, a first channel may be transmitted in the first carrier using the first subframe duration, and a second channel may be transmitted in the second carrier using the second subframe duration. In some embodiments, a first channel may be received in the first carrier using the first subframe duration, and a second channel may be received in the second carrier using the second subframe duration.

Each of the first subframe structure and the second subframe structure may include one or more uplink subframes and/or one or more downlink subframes. In some embodiments, a type of channel to be transmitted may be identified by the communication management module 515, and the channel may be transmitted using the first radio frequency spectrum band communication management module 525 or using the second radio frequency spectrum band communication management module 530 in an uplink subframe. The uplink subframe may use either the first subframe duration or the second subframe duration, wherein the subframe duration that is used is based at least in part on the identified type of channel. That is, the subframe duration of an uplink subframe may be channel dependent (e.g., Physical Uplink Shared Channel (PUSCH) may have an uplink subframe with a subframe duration of one millisecond, while a Physical Uplink Control Channel (PUCCH) may have an uplink subframe with a subframe duration of 0.5 milliseconds (at least when PUCCH carries ACKs/NACKs, to support better DL HARQ operation; however, PUCCH may have an uplink subframe with a subframe duration of one millisecond when it carries CQI)).

In some embodiments, the communication management module 515 may broadcast (e.g., broadcast or groupcast) an indicator to indicate a subframe duration during a subsequent period of communications. For example, a bit of evolved Physical Broadcast Channel (EPBCH) may be used to indicate whether, for the next 80 milliseconds, the subframe duration will be 0.5 milliseconds or one millisecond. This may be particularly useful for CCA Exempt Transmissions (CET).

In some embodiments, the communication management module 515 may transmit or receive at least one indication that indicates whether at least one downlink channel and/or at least one uplink channel will be based on the first subframe structure having the first subframe duration or on the second subframe structure having the second subframe duration. In some cases, and by way of example, the apparatus 505 may be a UE that is semi-statically configured with information indicating the subframe structure on which an uplink channel and/or a downlink channel is based. In other cases, and by way of further example, the apparatus 505 may be a UE that is dynamically provided an indication of the subframe structure on which an uplink channel and/or a downlink channel is based. In one example, a bit of downlink control information (DCI) may be used to indicate whether a PDSCH is based on the first subframe structure having the first subframe duration or the second subframe structure having the second subframe duration.

In some embodiments, an indication of whether a downlink channel or an uplink channel is based on the first subframe structure having the first subframe duration or on the second subframe structure having the second subframe duration may be implicit. For example, the apparatus 505 may detect a subframe duration of a downlink control channel (e.g., 0.5 milliseconds or one millisecond) and determine a subframe duration of a downlink shared channel (e.g., PDSCH) based at least in part on the subframe duration of the downlink control channel.

The communication management module 515 may be operated in various modes, such as, in a supplemental downlink mode, in a carrier aggregation mode, or in a standalone mode of operation in the second carrier. For example, the communication management module 515 may transmit or receive the first carrier as a primary component carrier, and transmit or receive the second carrier as a secondary component carrier. In some cases, the second carrier may be operated as a supplemental downlink to the primary component carrier. In some cases, the first carrier and the second carrier may be used in a carrier aggregation operation. In some cases, the first carrier and the second carrier may be used in a dual-connectivity operation.

Figure 6:
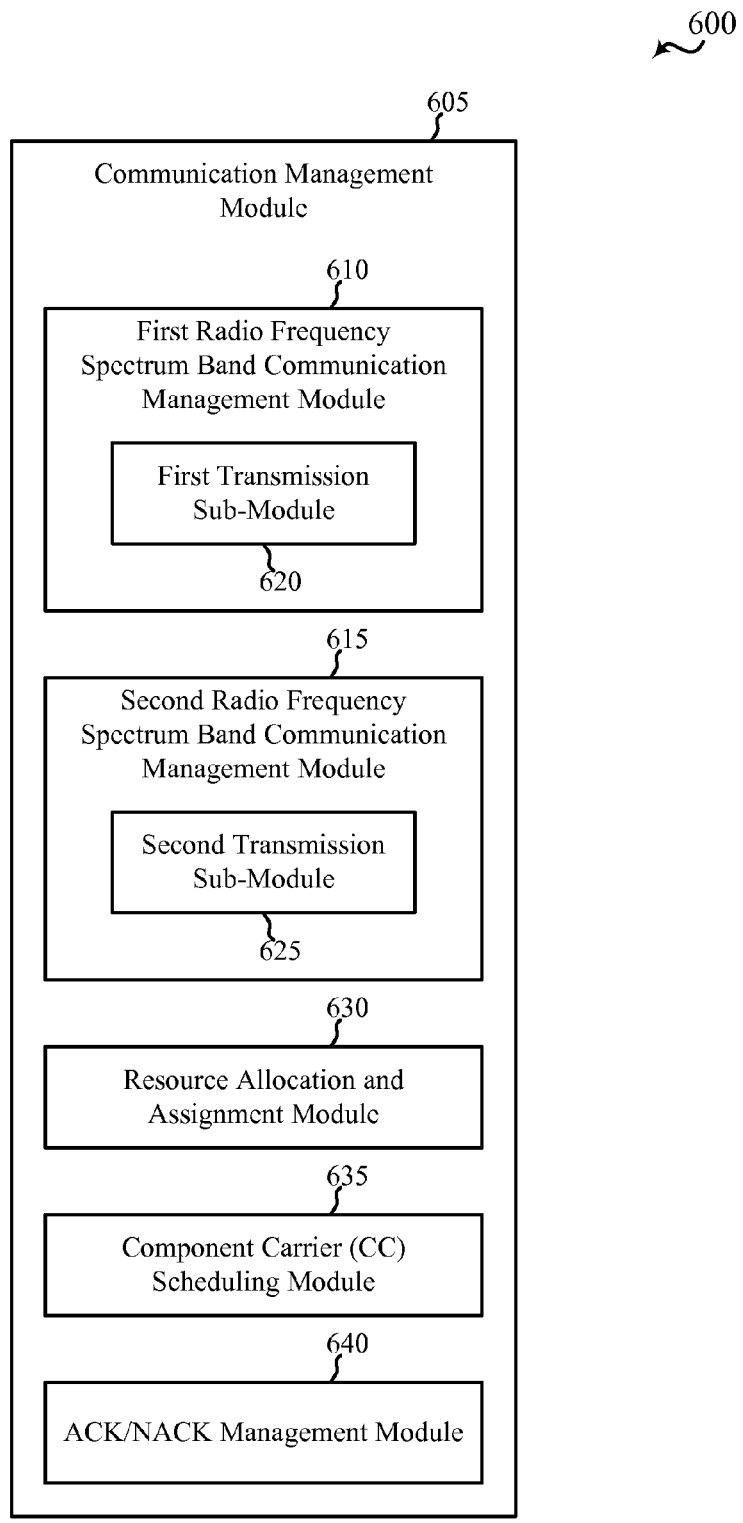
FIG. 6 shows a block diagram illustrating one embodiment of a communication management module usable for wireless communications, in accordance with various aspects of the present disclosure.

FIG. 6 shows a block diagram 600 illustrating a communication management module 605 usable for wireless communications, in accordance with various aspects of the present disclosure (e.g., at an apparatus such as one of the apparatuses 405 or 505 described with reference to FIG. 4 or 5, or at an eNB such as one of the base stations 105 or 205 described with reference to FIG. 1, 2A, or 2B). The communication management module 605 may be an example of one or more aspects of the communication management module 415 and/or 515 described with reference to FIGS. 4 and/or 5. The communication management module 605 may include a first radio frequency spectrum band communication management module 610, a second radio frequency spectrum band communication management module 615, a resource allocation and assignment module 630, a component carrier (CC) scheduling module 635, and/or an acknowledgement/non-acknowledgement (ACK/NACK) management module 640.

The components of the communication management module 605 may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the first radio frequency spectrum band communication management module 610 may be an example of one or more aspects of the first radio frequency spectrum band communication management module 525 described with reference to FIG. 5. The first radio frequency spectrum band communication management module 610 may be used to determine a first subframe structure having a first subframe duration for communicating in the first carrier. In some cases, the first radio frequency spectrum band communication management module 610 may include a first transmission sub-module 620. The first transmission sub-module 620 may be used to transmit and/or receive one or more channels in the first carrier, which channel(s) may use the first subframe structure having the first subframe duration. The first transmission sub-module 620 may also be used to transmit and/or receive one or more channels in the first carrier, which channel(s) may use the second subframe structure having the second subframe duration (or another subframe structure having the second subframe duration).

In some embodiments, the second radio frequency spectrum band communication management module 615 may be an example of one or more aspects of the second radio frequency spectrum band communication management module 530 described with reference to FIG. 5. The second radio frequency spectrum band communication management module 615 may be used to determine a second subframe structure having a second subframe duration for communicating in the second carrier. In some cases, the second radio frequency spectrum band communication management module 615 may include a second transmission sub-module 625. The second transmission sub-module 625 may be used to transmit and/or receive one or more channels in the second carrier, which channel(s) may use the second subframe structure having the second subframe duration. The second transmission sub-module 625 may also be used to transmit and/or receive one or more channels in the second carrier, which channel(s) may use the first subframe structure having the first subframe duration (or another subframe structure having the first subframe duration).

In some embodiments, the resource allocation and assignment module 630 may be used to assign downlink resources of a channel in the second carrier to at least one UE based on two or more resource blocks (RBs) of the second subframe structure. For example, the resource allocation and assignment module 630 may assign a downlink demodulation reference signal (DL DM-RS) and/or a channel state information reference signal (CSI-RS) of a channel based on two or more RBs of the second subframe structure.

In some embodiments, the resource allocation and assignment module 630 may be used to allocate resources using at least a pair of adjacent RBs of the second subframe structure. The adjacent RBs of the second subframe structure may function together as a single RB of the first subframe structure.

In some embodiments, the communication management module 605 may perform a transport block size (TBS) determination using at least a pair of adjacent RBs of the second subframe structure. For example, in some cases, a subframe of the first subframe structure may have 100 RBs (e.g., RBS 0-99) and a subframe of the second subframe structure may have 50 double RBs (DRBs 0-49), such that each DRB k corresponds to RB 2 k and RB 2 k+1. In these cases, and assuming for example that the first subframe duration is one millisecond and the second subframe duration is 0.5 milliseconds, the same TBS determination (e.g., TBS lookup) or a similar TBS determination (with minimal changes) may be performed for the first subframe structure and the second subframe structure.

In some embodiments, the resource allocation and assignment module 630 may be used to assign downlink resources of a channel in the second carrier to at least one UE based on a single RB of the second subframe structure. When resources are allocated using only a single RB of the second subframe structure, the TBS determination performed by the communication management module 605 for the second subframe structure may need to be adjusted compared to the TBS determination performed for the first subframe structure. For example, a number of assigned RBs may need to be multiplied by a factor based on the second subframe duration to produce an index, with the index being used to perform a TBS determination similarly to the TBS determination performed for the first subframe structure. When the first subframe duration is one millisecond and the second subframe duration is 0.5 milliseconds, the factor may be 0.5.

When RB and DRB resource allocations are used for the first subframe structure and the second subframe structure, respectively, a sub-band size for transmitting CSI feedback using the second subframe structure may need to be adjusted compared to a sub-band size for CSI feedback transmitted using the first subframe structure. For example, when the first subframe structure has a one millisecond duration and the first carrier is in an LTE/LTE-A radio frequency spectrum band, the communication management module 605 may use an 8 RBsub-band for transmitting CSI feedback, whereas, when the second subframe structure has a 0.5 millisecond duration and the second carrier is in an LTE network deploying an unlicensed radio frequency spectrum band, the communication management module 605 may adjust the sub-band size for CSI feedback to include a 16 RBsub-band. The sub-band size for CSI feedback using the second subframe structure in the second carrier may alternately be kept the same, but when deriving a CQI index, a reduced number of resource elements (REs) per subframe compared to the first subframe structure may need to be taken into account. The configuration for periodic CQI may remain the same for both the first subframe structure in the first carrier and the second subframe structure in the second carrier.

In some embodiments, the CC scheduling module 635 may be used to schedule CCs of subframes of the second subframe structure. In some cases, same-carrier scheduling may be used to schedule the CCs of subframes having the second subframe structure. For example, the CCs of subframes having the second subframe structure may be scheduled across subframes or scheduled for multiple subframes. Enhanced Physical Downlink Control Channel (EPDCCH) may be used for same-carrier scheduling, and may be useful as a result of its finer resource granularity. In some cases, EPDCCH resource allocations/configurations may be made as DRBs.

In some cases, cross-carrier scheduling may be used to schedule the CCs of subframes of the second subframe structure. For example, a control channel (e.g., PDCCH or another type of control channel) may be used to cross schedule CCs from subframes based on the first subframe structure to subframes based on the second subframe structure. Alternatively, cross-carrier scheduling can be based on an EPDCCH-like structure from subframes based on an LTE/LTE-A subframe structure to subframes based on an unlicensed radio frequency spectrum band subframe structure. If PDCCH is used for cross-carrier scheduling, especially when the scheduling carrier is an LTE carrier (not shown) deploying an unlicensed radio frequency spectrum band, a PDCCH resource granularity of less than a symbol (e.g., a 0.5 symbol granularity) may be used. Alternately, different resource granularities may be used, such as i) even RBs (or DRBs) in the first symbol, ii) the entire first symbol, or iii) the entire first symbol plus even RBs (or DRBs) in the second symbol. In some cases, one cell may use even RBs (or DRBs) and a different cell may use odd RBs (or DRBs). Alternately, cross-carrier scheduling may be performed within the CCs of the subframes of the second subframe structure. Cross-carrier scheduling may provide an opportunity for earlier decoding of subframes.

In some embodiments, the ACK/NACK management module 640 may be used to transmit or receive hybrid automatic repeat request ACK/NACK feedback for one or more downlink subframes based on the second subframe structure. The ACK/NACK feedback may be transmitted (e.g., by a UE) or received (e.g., at an eNB) via an uplink subframe. In some cases, the ACK/NACK management module 640 may map two or more downlink subframes based on the second subframe structure to a single uplink subframe based on the first subframe structure for the purpose of transmitting/receiving ACK/NACK feedback, and ACK/NACK feedback for the two or more downlink subframes based on the second subframe structure may be transmitted or received in the single uplink subframe based on the first subframe structure. In other cases, the ACK/NACK management module 640 may map two or more downlink subframes based on the second subframe structure to a single uplink subframe based on the second subframe structure for the purpose of transmitting/receiving ACK/NACK feedback, and ACK/NACK feedback for the two or more downlink subframes based on the second subframe structure may be received in the single uplink subframe based on the second subframe structure.

Figure 7:
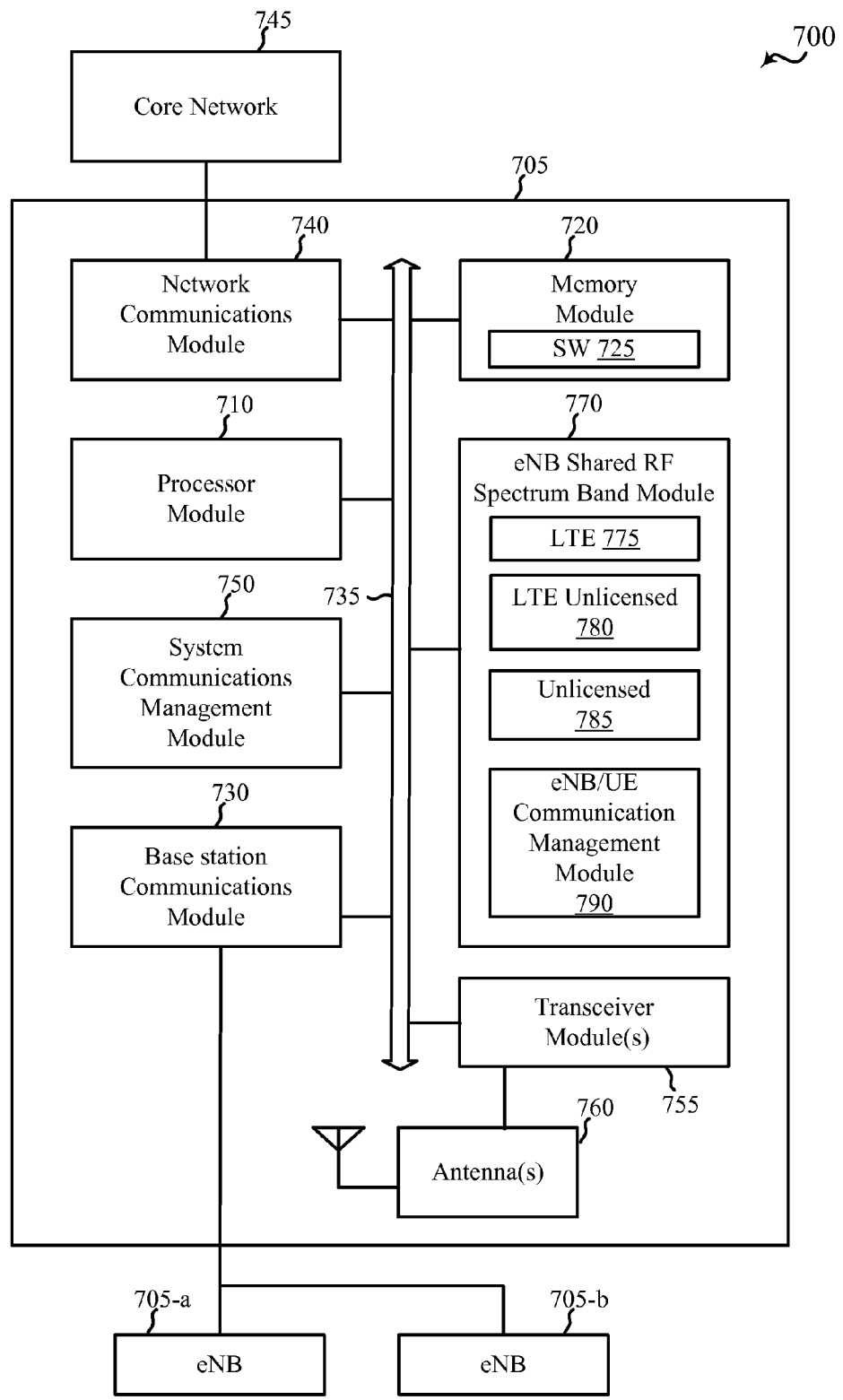
FIG. 7 shows a block diagram illustrating an eNB configured for wireless communications, in accordance with various aspects of the present disclosure.

FIG. 7 shows a block diagram 700 illustrating an eNB 705 configured for wireless communications, in accordance with various aspects of the present disclosure. In some embodiments, the eNB 705 may be an example of one or more aspects of one of the apparatuses 405 and/or 505 described with reference to FIGS. 4 and/or 5, and/or one of the eNBs 105 and/or 205 described with reference to FIGS. 1, 2A, and/or 2B. The eNB 705 may be configured to implement at least some of the features and functions described with reference to FIGS. 1, 2A, 2B, 3, 4, 5, and/or 6. The eNB 705 may include a processor module 710, a memory module 720, at least one transceiver module (represented by transceiver module(s) 755), at least one antenna (represented by antenna(s) 760), and/or an eNB shared RF spectrum band module 770. The eNB 705 may also include one or more of a base station communications module 730, a network communications module 740, and a system communications management module 750. Each of these components may be in communication with each other, directly or indirectly, over one or more buses 735.

The memory module 720 may include random access memory (RAM) and/or read-only memory (ROM). The memory module 720 may store computer-readable, computer-executable software (SW) code 725 containing instructions that are configured to, when executed, cause the processor module 710 to perform various functions described herein for communicating over a first carrier (e.g., a carrier in an LTE/LTE-A and/or licensed radio frequency spectrum band) and/or a second carrier. Alternatively, the software code 725 may not be directly executable by the processor module 710 but be configured to cause the eNB 705 (e.g., when compiled and executed) to perform various of the functions described herein.

The processor module 710 may include an intelligent hardware device, e.g., a central processing unit (CPU), a microcontroller, an ASIC, etc. The processor module 710 may process information received through the transceiver module(s) 755, the base station communications module 730, and/or the network communications module 740. The processor module 710 may also process information to be sent to the transceiver module(s) 755 for transmission through the antenna(s) 760, to the base station communications module 730 for transmission to one or more other base stations or eNBs 705-a and 705-b, and/or to the network communications module 740 for transmission to a core network 745, which may be an example of aspects of the core network 130 described with reference to FIG. 1. The processor module 710 may handle, alone or in connection with the eNB shared RF spectrum band module 770, various aspects of communicating over the first carrier and/or the second carrier.

The transceiver module(s) 755 may include a modem configured to modulate packets and provide the modulated packets to the antenna(s) 760 for transmission, and to demodulate packets received from the antenna(s) 760. The transceiver module(s) 755 may in some cases be implemented as one or more transmitter modules and one or more separate receiver modules. The transceiver module(s) 755 may support communications in the first carrier and/or the second carrier. The transceiver module(s) 755 may be configured to communicate bi-directionally, via the antenna(s) 760, with one or more of the UEs or apparatuses 115, 215, 405, and/or 505 described with reference to FIGS. 1, 2A, 2B, 4, and/or 5, for example. The eNB 705 may typically include multiple antennas 760 (e.g., an antenna array). The eNB 705 may communicate with the core network 745 through the network communications module 740. The eNB 705 may also communicate with other base stations or eNBs, such as the eNBs 705-a and 705-b, using the base station communications module 730.

According to the architecture of FIG. 7, the system communications management module 750 may manage communications with other base stations, eNBs, and/or apparatuses. In some cases, functionality of the system communications management module 750 may be implemented as a component of the transceiver module(s) 755, as a computer program product, and/or as one or more controller elements of the processor module 710.

The eNB shared RF spectrum band module 770 may be configured to perform and/or control some or all of the features and/or functions described with reference to FIGS. 1, 2A, 2B, 3, 4, 5, and/or 6 related to wireless communications in a shared radio frequency spectrum band. In some cases, the eNB shared RF spectrum band module 770 may be configured to support a supplemental downlink mode, a carrier aggregation mode, and/or a standalone mode of operation when the second carrier is in an unlicensed radio frequency spectrum band. The eNB shared RF spectrum band module 770 may include an LTE module 775 configured to handle LTE communications, an LTE unlicensed module 780 configured to handle communications in an unlicensed radio frequency spectrum band, and/or an unlicensed module 785 configured to handle additional in an unlicensed spectrum. The eNB shared RF spectrum module 770 may also include an eNB/UE communication management module 790. The eNB/UE communication management module 790 may be an example of one or more aspects of the communication management module 415, 515, and/or 605 described with reference to FIGS. 4, 5, and/or 6. The eNB shared RF spectrum band module 770, or portions of it, may include a processor, and/or some or all of the functionality of the eNB shared RF spectrum band module 770 may be performed by the processor module 710 and/or in connection with the processor module 710.

Figure 8:
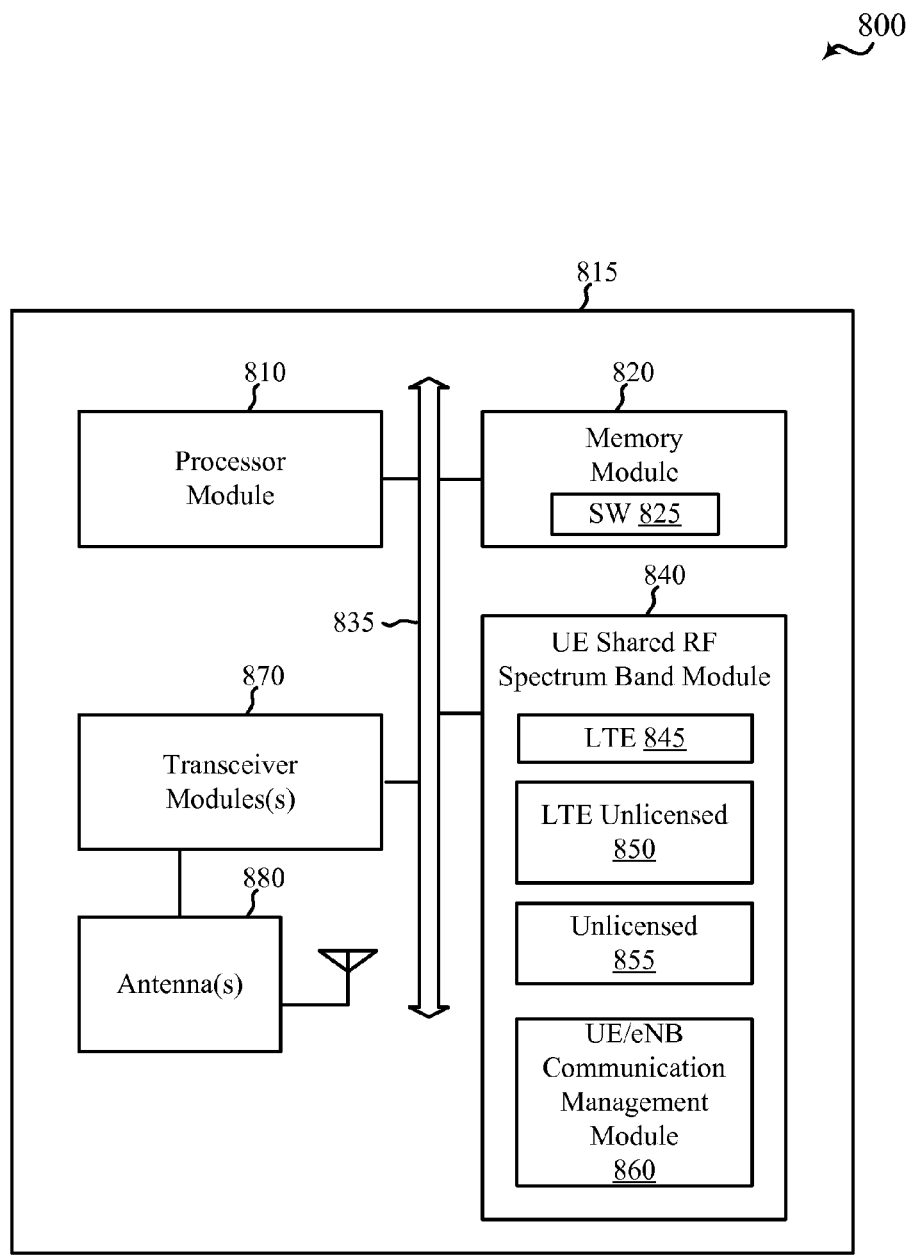
FIG. 8 shows a block diagram illustrating a UE configured for wireless communications, in accordance with various aspects of the present disclosure.

FIG. 8 shows a block diagram 800 illustrating a UE 815 configured for wireless communications, in accordance with various aspects of the present disclosure. The UE 815 may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 815 may in some cases have an internal power supply (not shown), such as a small battery, to facilitate mobile operation. In some embodiments, the UE 815 may be an example of one or more aspects of one of the apparatuses 405 and/or 505 described with reference to FIGS. 4 and/or 5, and/or one of the UEs 115 and/or 215 described with reference to FIG. 1, 2A, and/or 2B. The UE 815 may be configured to implement at least some of the features and functions described with reference to FIGS. 1, 2A, 2B, 3, 4, 5, and/or 6. The UE 815 may be configured to communicate with one or more of the eNBs or apparatuses 105, 205, 405, 505, and/or 705 described with reference to FIGS. 1, 2A, 2B, 4, 5, and/or 7.

The UE 815 may include a processor module 810, a memory module 820, at least one transceiver module (represented by transceiver module(s) 870), at least one antenna (represented by antenna(s) 880), and/or a UE shared RF spectrum band module 840. Each of these components may be in communication with each other, directly or indirectly, over one or more buses 835.

The memory module 820 may include RAM and/or ROM. The memory module 820 may store computer-readable, computer-executable software (SW) code 825 containing instructions that are configured to, when executed, cause the processor module 810 to perform various functions described herein for communicating over a first carrier (e.g., a carrier in an LTE/LTE-A and/or licensed radio frequency spectrum band) and/or a second carrier (e.g., a carrier in an unlicensed radio frequency spectrum band). Alternatively, the software code 825 may not be directly executable by the processor module 810 but be configured to cause the UE 815 (e.g., when compiled and executed) to perform various of the functions described herein.

The processor module 810 may include an intelligent hardware device, e.g., a CPU, a microcontroller, an ASIC, etc. The processor module 810 may process information received through the transceiver module(s) 870 and/or information to be sent to the transceiver module(s) 870 for transmission through the antenna(s) 880. The processor module 810 may handle, alone or in connection with the UE shared RF spectrum band module 840, various aspects of communicating over the first carrier and/or the second carrier.

The transceiver module(s) 870 may include a modem configured to modulate packets and provide the modulated packets to the antenna(s) 880 for transmission, and to demodulate packets received from the antenna(s) 880. The transceiver module(s) 870 may in some cases be implemented as one or more transmitter modules and one or more separate receiver modules. The transceiver module(s) 870 may support communications in the first carrier and/or the second carrier. The transceiver module(s) 870 may be configured to communicate bi-directionally, via the antenna(s) 880, with one or more of the eNBs or apparatuses 105, 205, 405, 505, and/or 705 described with reference to FIGS. 1, 2A, 2B, 4, 5, and/or 7. While the UE 815 may include a single antenna, there may be embodiments in which the UE 815 may include multiple antennas 880.

The UE shared RF spectrum band module 840 may be configured to perform and/or control some or all of the features and/or functions described with reference to FIGS. 1, 2A, 2B, 3, 4, 5, and/or 6 related to wireless communications in a shared radio frequency spectrum band. For example, the UE shared RF spectrum band module 840 may be configured to support a supplemental downlink mode, a carrier aggregation mode, and/or a standalone mode of operation when the second carrier is in an unlicensed radio frequency spectrum band. The UE shared RF spectrum band module 840 may include an LTE module 845 configured to handle LTE communications, an LTE unlicensed module 850 configured to handle LTE communications using an unlicensed radio frequency spectrum band, and/or an unlicensed module 855 configured to handle other communications in an unlicensed spectrum. The UE shared RF spectrum band module 840 may also include a UE/eNB communication management module 860 configured. The UE/eNB communication management module 860 may be an example of one or more aspects of the communication management module 415, 515, and/or 605 described with reference to FIGS. 4, 5, and/or 6. The UE shared RF spectrum band module 840, or portions of it, may include a processor, and/or some or all of the functionality of the UE shared RF spectrum band module 840 may be performed by the processor module 810 and/or in connection with the processor module 810.

Figure 9:
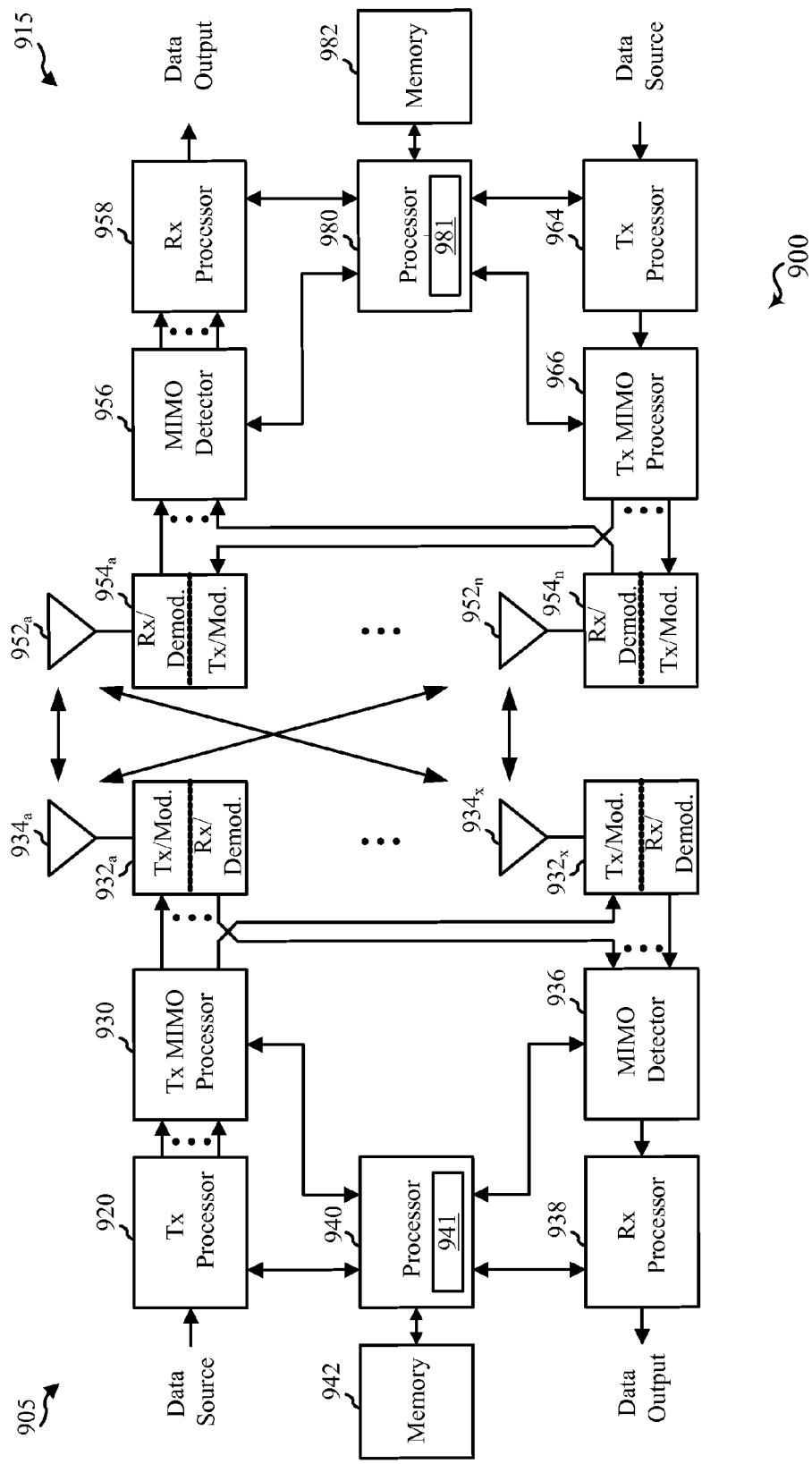
FIG. 9 illustrates a block diagram of a multiple-input multiple-output (MIMO) communications system that is shown to include an eNB and a UE, in accordance with various aspects of the present disclosure.

FIG. 9 illustrates a block diagram of a multiple-input multiple-output (MIMO) communications system 900 that is shown to include an eNB 905 and a UE 915, in accordance with various aspects of the present disclosure. The eNB 905 and the UE 915 may support wireless communications over a first carrier (e.g., a carrier in an LTE/LTE-A and/or licensed radio frequency spectrum band) and/or a second carrier (e.g., a carrier in an unlicensed radio frequency spectrum band). The eNB 905 may be an example of one or more aspects of one of the apparatuses 405 and/or 505 described with reference to FIGS. 4 and/or 5, and/or one of the eNBs 105, 205, and/or 705 described with reference to FIGS. 1, 2A, 2B, and/or 7. The UE 915 may be an example of one or more aspects of one of the apparatuses 405 and/or 505 described with reference to FIGS. 4 and/or 5, and/or one of the UEs 115, 215, and/or 815 described with reference to FIGS. 1, 2A, 2B, and/or 8. The MIMO communications system 900 may illustrate aspects of the wireless communication system 100, 200, and/or 250 described with reference to FIGS. 1, 2A, and/or 2B.

The eNB 905 may be equipped with antennas $934_a$ through $934_x$, and the UE 915 may be equipped with antennas $952_a$ through $952_n$. In the MIMO communications system 900, the eNB 905 may be able to send data over multiple communication links at the same time. Each communication link may be called a "layer" and the "rank" of the communication link may indicate the number of layers used for communication. For example, in a 2×2 MIMO system where the eNB 905 transmits two "layers," the rank of the communication link between the eNB 905 and the UE 915 may be two.

At the eNB 905, a transmit (Tx) processor 920 communicatively coupled with a transmit memory 942 may receive data from a data source. The transmit processor 920 may process the data. The transmit processor 920 may also generate a reference sequence for a number of reference symbols and/or a cell-specific reference signal. A transmit (Tx) MIMO processor 930 may perform spatial processing (e.g., precoding) on data symbols, control symbols, and/or reference symbols, if applicable, and may provide output symbol streams to the transmit (Tx) modulators 932$_a$ through 932$_x$. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink (DL) signal. In one example, DL signals from modulators 932$_a$ through 932$_x$ may be transmitted via the antennas 934$_a$ through 934$_x$, respectively.

At the UE 915, the antennas 952$_a$ through 952$_n$ may receive the DL signals from the eNB 905 and may provide the received signals to the receive (Rx) demodulators 954$_a$ through 954$_n$, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all the demodulators 954$_a$ through 954$_n$, perform MIMO detection on the received symbols if applicable, and provide detected symbols. A receive (Rx) processor 958 may process (e.g., demodulate, deinterleave, and decode) the detected symbols, providing decoded data for the UE 915 to a data output, and provide decoded control information to a processor 980, or memory 982.

On the uplink (UL), at the UE 915, a transmit (Tx) processor 964 may receive and process data from a data source. The transmit processor 964 may also generate a reference sequence for a number of reference symbols and/or a reference signal. The symbols from the transmit processor 964 may be precoded by a transmit (Tx) MIMO processor 966 if applicable, further processed by the transmit (Tx) modulators 954$_a$ through 954$_n$ (e.g., for SC-FDMA, etc.), and be transmitted to the eNB 905 in accordance with the transmission parameters received from the eNB 905. At the eNB 905, the UL signals from the UE 915 may be received by the antennas 934, processed by the receiver (Rx) demodulators 932, detected by a MIMO detector 936 if applicable, and further processed by a receive (Rx) processor 938. The receive processor 938 may provide decoded data to a data output and to the processor 940.

The processors 940 and 980 may include respective modules or functions 941 and 981 for managing wireless communications in the first carrier and/or the second carrier. In some embodiments, the modules or functions 941, 981 may be examples of one or more aspects of the communication management module 415, 515, 605, 790, and/or 860 described with reference to FIGS. 4, 5, 6, 7, and/or 8. The eNB 905 may use the module or function 941 to communicate with the UE 915 and/or other UEs or apparatuses, while the UE 915 may use the module or function 981 to communicate with the eNB 905 and/or other eNBs or apparatuses. In some cases, the eNB 905 and UE 915 may only transmit a channel or channels over the second carrier after performing a successful CCA.

The components of the eNB 905 may, individually or collectively, be implemented with one or more ASICs adapted to perform some or all of the applicable functions in hardware. Each of the noted modules may be a means for performing one or more functions related to operation of the MIMO communications system 900. Similarly, the components of the UE 915 may, individually or collectively, be implemented with one or more ASICs adapted to perform some or all of the applicable functions in hardware. Each of the noted components may be a means for performing one or more functions related to operation of the MIMO communications system 900.

FIGS. 10-13 illustrate an exemplary 0.5 ms subframe structure that may be used, for example, in a supplemental downlink mode, in accordance with various aspects of the present disclosure. In some cases, the subframe structure shown in FIGS. 10-13 may be used as the second subframe structure having the second subframe duration with respect to one or more of the apparatuses 405 and/or 505 described with reference to FIGS. 4 and/or 5, one or more of the eNBs 705 and/or 905 described with reference to FIGS. 7 and/or 9, and/or one or more of the UEs 815 and/or 915 described with reference to FIGS. 8 and/or 9.

Figure 10:
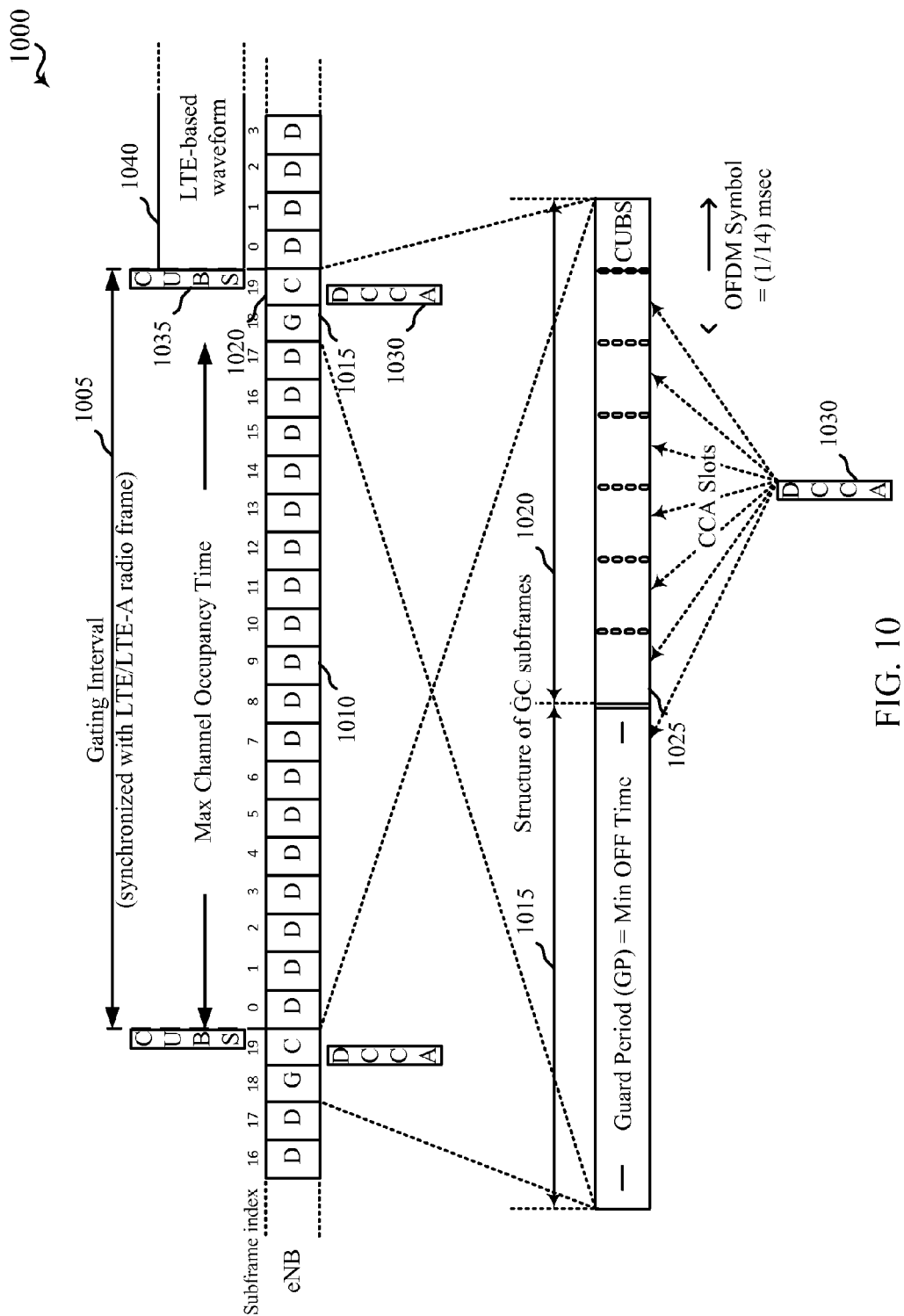
FIG. 10 illustrates an example of a periodic gating interval usable for the transmission of downlink subframes in a supplemental downlink mode of an LTE deployment of an unlicensed radio frequency spectrum band, in accordance with various aspects of the present disclosure.

FIG. 10 illustrates an example 1000 of a periodic gating interval 1005 usable for the transmission of downlink subframes in a supplemental downlink mode of LTE deploying an unlicensed radio frequency spectrum band, in accordance with various aspects of the present disclosure. The periodic gating interval 1005 may be used by both eNBs and UEs that support LTE using an unlicensed radio frequency spectrum band. Examples of such eNBs may be the eNBs 105, 205, 705, and/or 905 described with reference to FIGS. 1, 2A, 2B, 7, and/or 9. Examples of such UEs may be the UEs 115, 215, 815, and/or 915 described with reference to FIGS. 1, 2A, 2B, 8, and/or 9.

By way of example, the duration of the periodic gating interval 1005 may be equal to (or approximately equal to) the duration of an LTE/LTE-A radio frame. In some cases, the boundaries of the periodic gating interval 1005 may be synchronized with (e.g., aligned with) the boundaries of the LTE/LTE-A radio frame.

The periodic gating interval 1005 may include a number of subframes (e.g., twenty subframes labeled SF0, SF1, SF19), which subframes may be defined by a subframe structure having a 0.5 millisecond subframe duration. Subframes SF0 through SF17 may be downlink (D) subframes 1010, subframe SF18 may be a guard period (G) subframe 1015, and SF19 may be a CCA (C) subframe 1020. The D subframes 1010 may collectively define a channel occupancy time of an LTE/LTE-A radio frame, and the G subframe 1015 may define a channel idle time. Under some regulatory requirements, an LTE/LTE-A radio frame may have a maximum channel occupancy time (ON time) between one and 9.5 milliseconds, and a minimum channel idle time (OFF time) of five percent of the channel occupancy time (e.g., a minimum of 50 microseconds). To ensure compliance with the LTE/LTE-A standards, the periodic gating interval 1005 may abide by these requirements by providing a 0.5 millisecond guard period (i.e., OFF time) as part of the G subframe 1015.

The C subframe 1020 may include up to seven CCA slots 1025 (although 6 CCA slots are shown) in which eNBs contending for a particular channel of the unlicensed radio frequency spectrum band may perform a downlink CCA (DCCA 1030). Each CCA slot 1025 may coincide with an OFDM symbol position having a duration of roughly 1/14 milliseconds.

In some cases, different ones of the CCA slots 1025 may be pseudo-randomly identified or selected by an eNB in different occurrences of the C subframe 1020 (i.e., in different C subframes used to perform a DCCA 1030 for different transmission intervals of the unlicensed radio frequency spectrum band). The pseudo-random identification or selection of CCA slots 1025 may be controlled using a hopping sequence. In other cases, the same CCA slot 1025 may be selected by an eNB in different occurrences of the C subframe.

The eNBs of a wireless communications system may be operated by the same or different operators. In some embodiments, eNBs operated by different operators may select different ones of the CCA slots 1025 in a particular C subframe 1020, thereby avoiding CCA collisions between different operators. If the pseudo-random selection mechanisms of different operators are coordinated, CCA slots 1025 may be pseudo-randomly selected by a plurality of different operators such that the eNBs of the different operators each have an equal opportunity to perform a DCCA 1030 in the earliest CCA slot 1025 of particular transmission intervals. Thus, over time, the eNBs of the different operators may each have an opportunity to perform a DCCA 1030 first and gain access to a transmission interval of the unlicensed radio frequency spectrum band regardless of the needs of eNBs of other operators.

When an eNB's DCCA 1030 indicates that a channel is available, but the eNB's DCCA 1030 is completed before the end of the periodic gating interval 1005, the eNB may transmit one or more signals to reserve the channel until the end of the periodic gating interval 1005. The one or more signals may in some cases include Channel Usage Pilot Signals (CUPS), Channel Usage Beacon Signals (CUBS 1035), and/or a cell-specific reference signal (CRS). CUPS, CUBS 1035, and/or a CRS may be used for both channel synchronization and channel reservation. That is, a device that performs a CCA for the channel after another eNB begins to transmit CUPS, CUBS 1035, or a CRS on the channel may detect the energy of the CUPS, CUBS 1035, or the CRS and determine that the channel is currently unavailable.

Following an eNB's successful completion of CCA for a channel and/or the transmission of CUPS, CUBS 1035, or a CRS over the channel, the eNB may use the channel for up to a predetermined period of time (e.g., a portion of an LTE/LTE-A radio frame) to transmit a waveform (e.g., an LTE-based waveform 1040).

Figure 11:
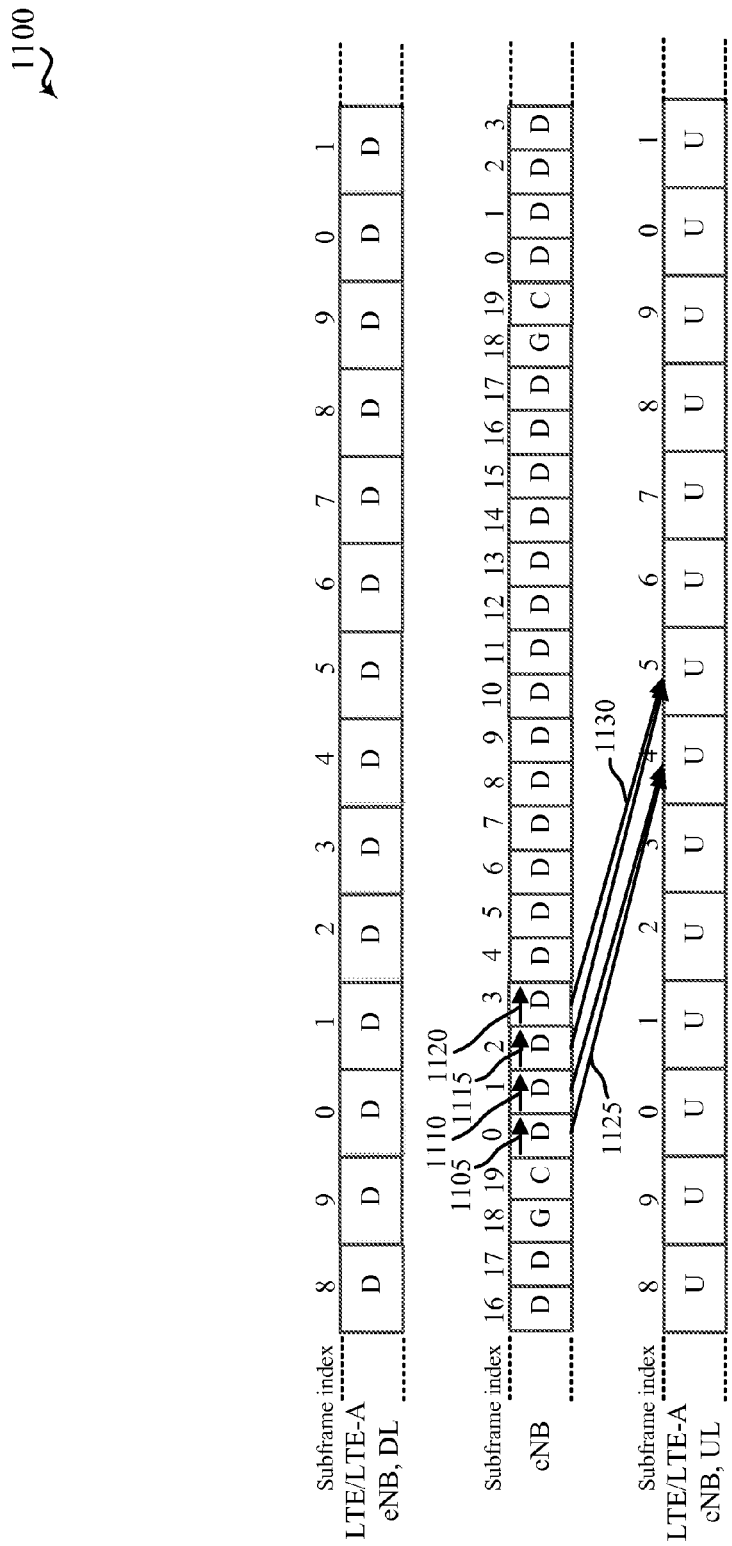
FIG. 11 shows an example of same-carrier scheduling of CCs of the unlicensed radio frequency spectrum band subframes SF0 through SF19 shown in FIG. 10, in accordance with various aspects of the present disclosure.

FIG. 11 shows an example 1100 of same-carrier scheduling of CCs of the unlicensed radio frequency spectrum band subframes SF0 through SF19 shown in FIG. 10, in accordance with various aspects of the present disclosure. By way of example, the CCs of the subframes may be scheduled on a per subframe basis, as indicated by the arrows 1105, 1110, 1115, and/or 1120 pointing to the right in FIG. 11. By way of another example, the CCs of the subframes may be scheduled across subframes or for multiple subframes (not shown in FIG. 11), e.g., each even subframe may schedule itself and the next odd subframe. For example, the subframe SF0 may schedule itself and the next subframe SF1. EPDCCH may be used for same-carrier scheduling, and may be useful as a result of its finer resource granularity. In some cases, EPDCCH resource allocations/configurations may be made as DRBs.

FIG. 11 also shows an example of ACK/NACK feedback transmissions for the subframes SF0 through SF19. By way of example, two or more downlink subframes (e.g., SF0 and SF1 of the eNB) may be mapped to a single uplink subframe of an LTE/LTE-A eNB, as indicated by the set of arrows 1125. The downlink subframes SF2 and SF3 of the eNB may be mapped to another uplink subframe of the LTE/LTE-A eNB, as indicated by the set of arrows 1130. In some cases, the ACK/NACK feedback transmissions of the two or more subframes mapped to a single LTE/LTE-A uplink subframe may be time-domain bundled (e.g., to reduce the ACK/NACK feedback payload). In other cases, the ACK/NACK feedback transmissions may not be time-domain bundled.

For sake of comparison, FIG. 11 also illustrates a relationship between an exemplary downlink subframe structure of an LTE/LTE-A eNB and each of the downlink subframe structure of the eNB and the uplink subframe structure of an LTE/LTE-A eNB. By way of example, the downlink and uplink subframe structures of the LTE/LTE-A eNB(s) may each have a one millisecond subframe duration.

Figure 12:
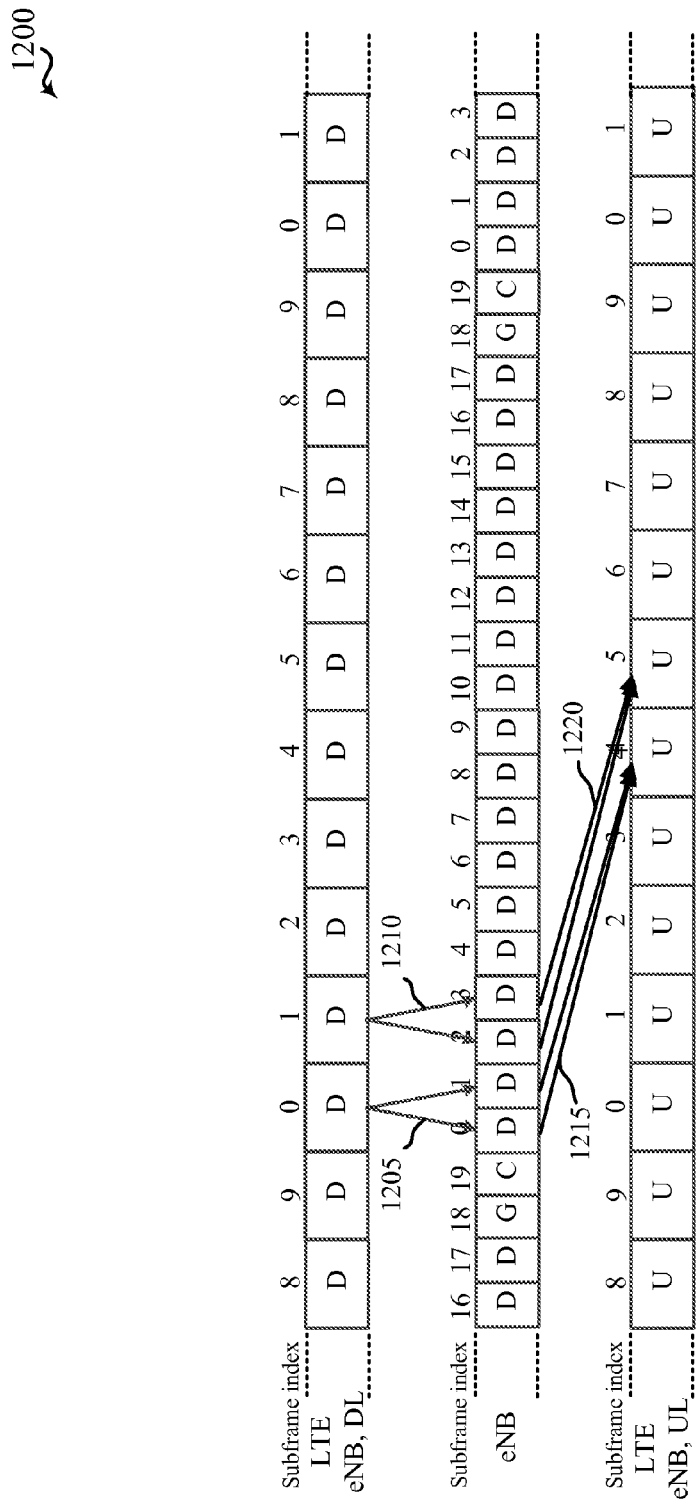
FIG. 12 shows an example of cross-carrier scheduling of CCs of the unlicensed radio frequency spectrum band subframes SF0 through SF19 shown in FIG. 10, in accordance with various aspects of the present disclosure.

FIG. 12 shows an example 1200 of cross-carrier scheduling of CCs of unlicensed radio frequency spectrum band subframes SF0 through SF19 shown in FIG. 10, in accordance with various aspects of the present disclosure. For example, a control channel (e.g., PDCCH or another type of control channel) may be used to cross schedule CCs from subframes based on an LTE/LTE-A subframe structure to subframes based on a subframe structure, as indicated by the sets of arrows 1205 and 1210 pointing from downlink subframes of an LTE/LTE-A eNB to multiple ones of the subframes of the eNB. Alternatively, cross-carrier scheduling can be based on an EPDCCH-like structure from subframes based on an LTE/LTE-A subframe structure to subframes based on a subframe structure. If PDCCH is used for cross-carrier scheduling, especially when the scheduling carrier is a LTE carrier deploying an unlicensed radio frequency spectrum band (not shown), a PDCCH resource granularity of less than a symbol (e.g., a 0.5 symbol granularity) may be used. Alternately, different resource granularities may be used, such as i) even RBs in the first symbol, ii) the entire first symbol, or iii) the entire first symbol plus even RBs in the second symbol. In some cases, one cell may use even RBs and a different cell may use odd RBs.

FIG. 12 also shows an example of ACK/NACK feedback transmissions for the subframes SF0 through SF19. By way of example, two or more downlink subframes (e.g., SF0 and SF1 of the eNB) may be mapped to a single uplink subframe of an LTE/LTE-A eNB, as indicated by the set of arrows 1215. The downlink subframes SF2 and SF3 of the eNB may be mapped to another uplink subframe of the LTE/LTE-A eNB, as indicated by the set of arrows 1220. In some cases, the ACK/NACK feedback transmissions of the two or more subframes mapped to a single LTE/LTE-A uplink subframe may be time-domain bundled (e.g., to reduce the ACK/NACK feedback payload). In other cases, the ACK/NACK feedback transmissions may not be time-domain bundled.

Figure 13:
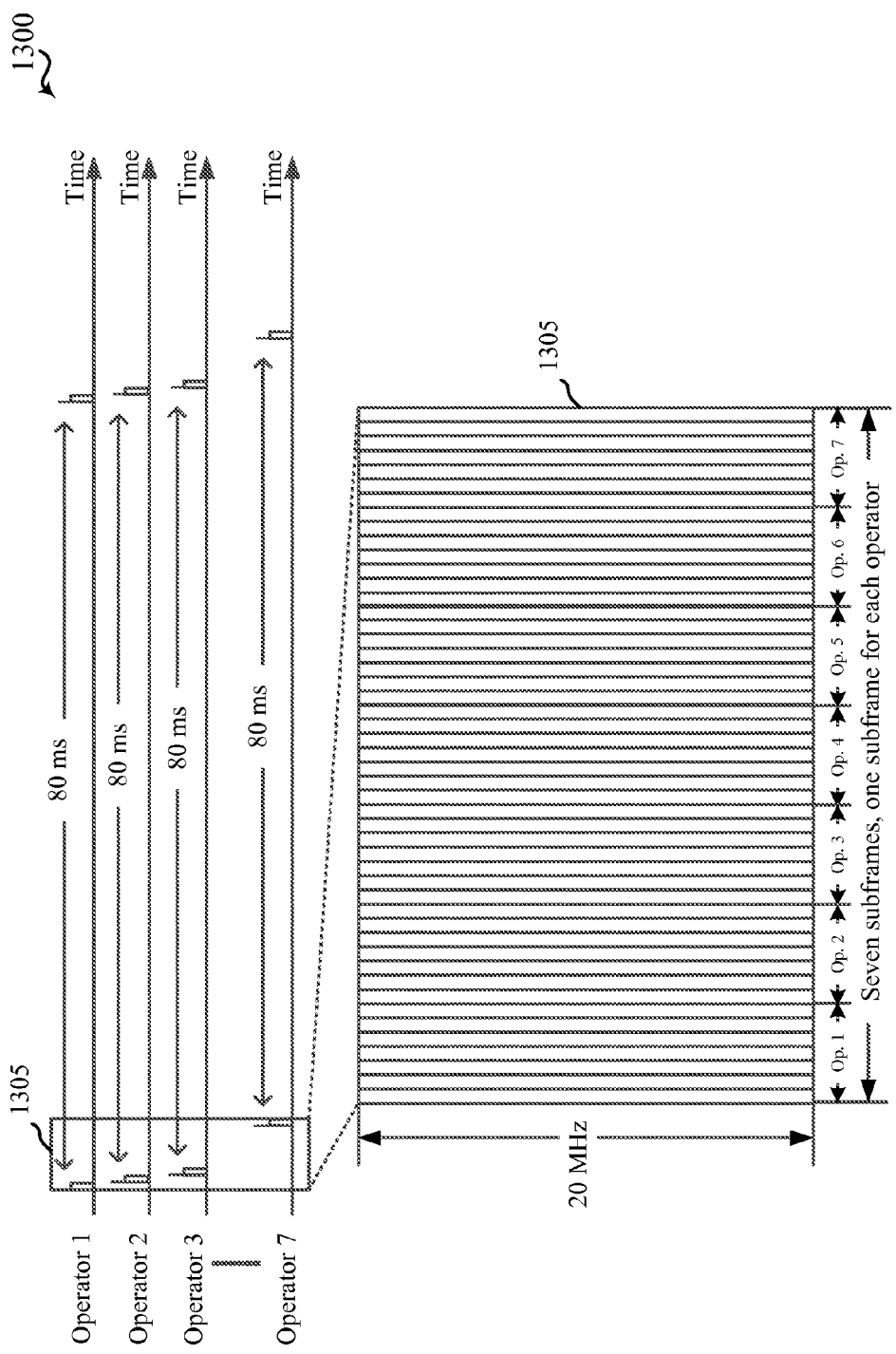
FIG. 13 shows an example of CCA Exempt Transmissions (CETs) using the subframe structure described with reference to FIGS. 10-12, in accordance with various aspects of the present disclosure.

FIG. 13 shows an example 1300 of CCA Exempt Transmissions (CETs) using the subframe structure described with reference to FIGS. 10-12, in accordance with various aspects of the present disclosure. As shown, an allocation of resources for CETs may be made, for example, once every eighty milliseconds (80 ms). Each of a number of operators deploying an unlicensed radio frequency spectrum band may be provided a subframe having the subframe structure shown in FIGS. 10-12 for transmitting CETs. By way of example, FIG. 13 shows adjacent CET subframes for seven different operators. Such a structure may be applicable to both downlink and uplink subframes.

Figure 14:
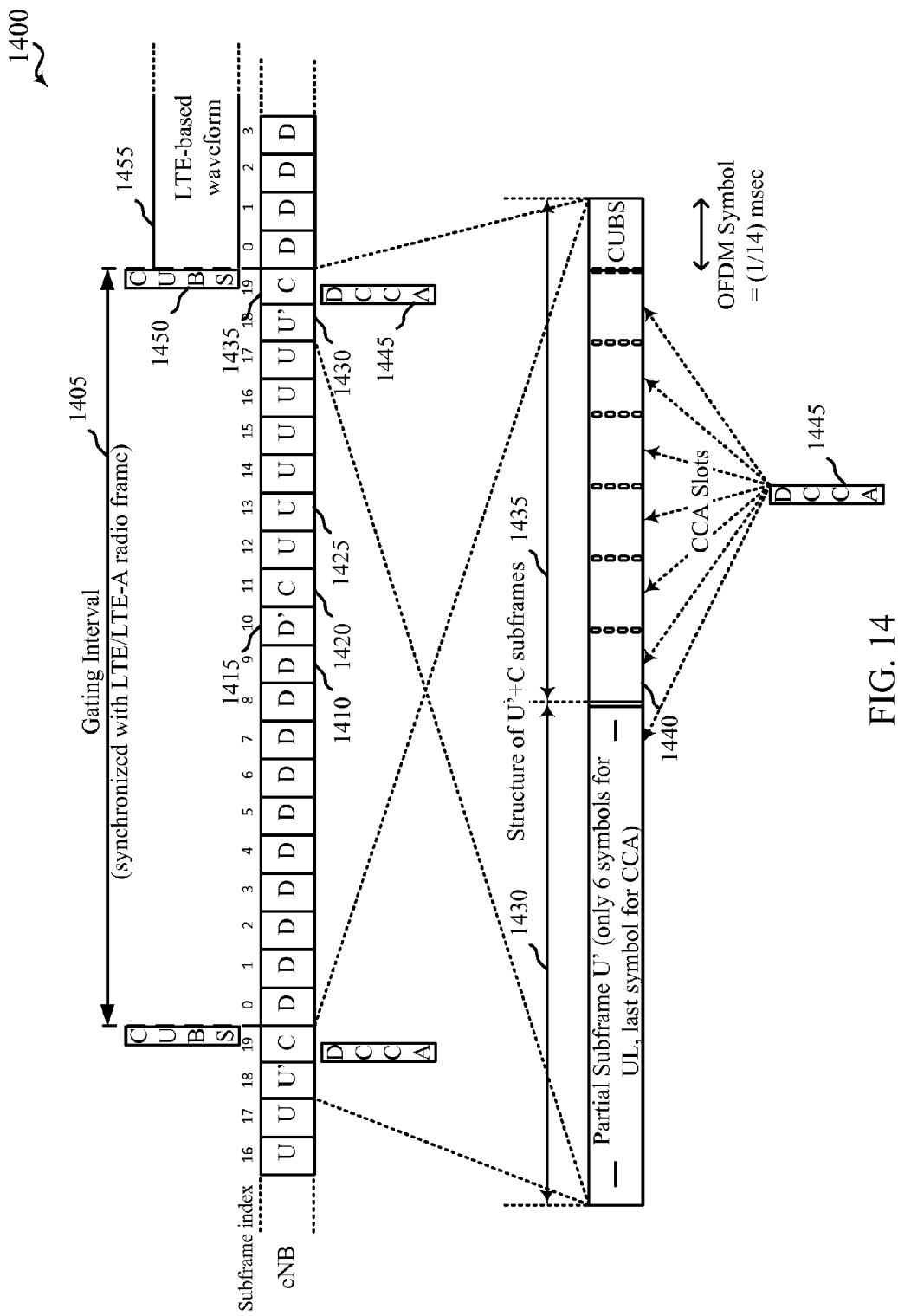
FIG. 14 illustrates an example of a periodic gating interval usable for the transmission of downlink subframes in a carrier aggregation or standalone mode of an LTE deployment of an unlicensed radio frequency spectrum band, in accordance with various aspects of the present disclosure.
Figure 15:
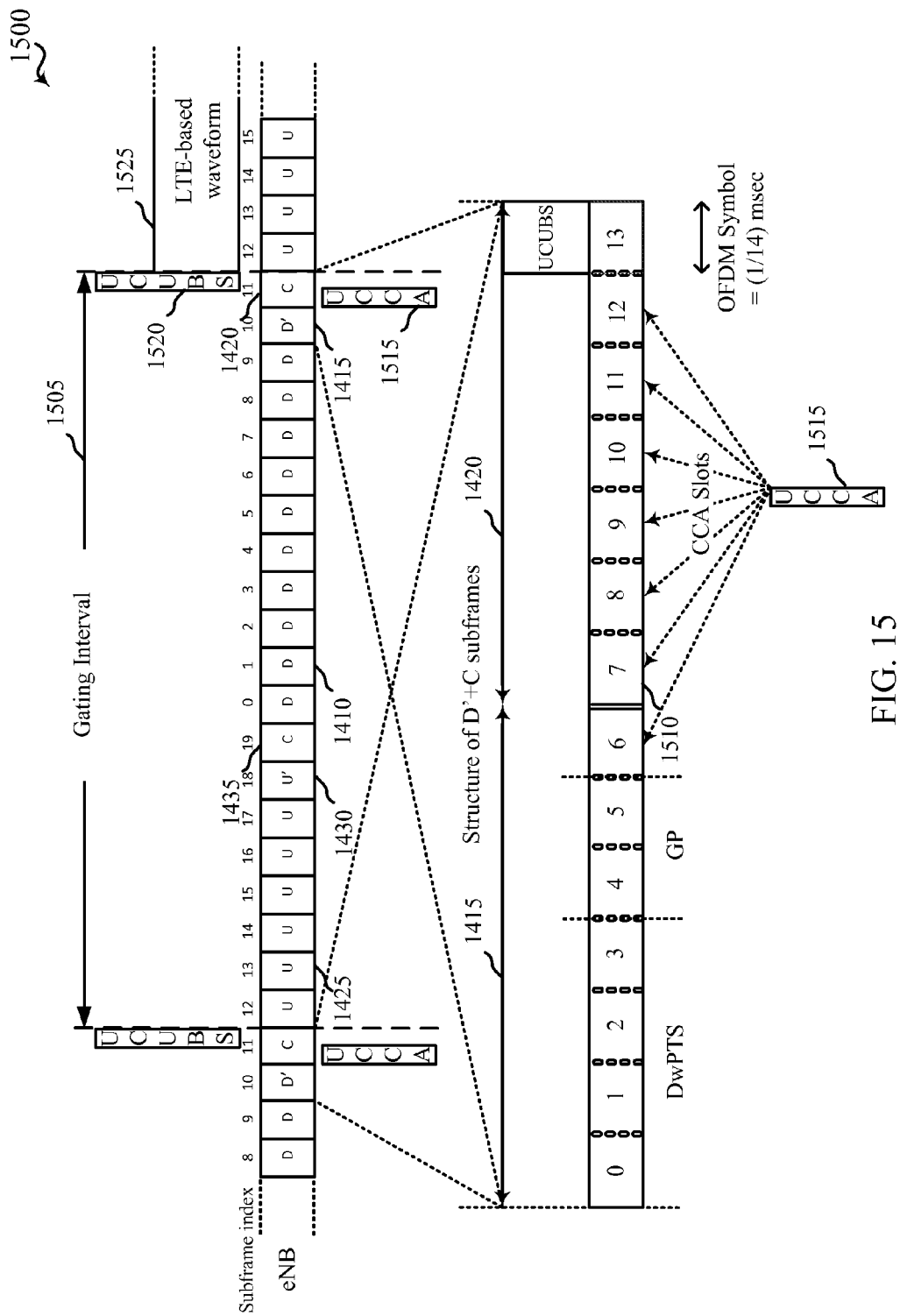
FIG. 15 illustrates an example of a periodic gating interval usable for the transmission of uplink subframes in a carrier aggregation or standalone mode of an LTE deployment of an unlicensed radio frequency spectrum band, in accordance with various aspects of the present disclosure.
Figure 16:
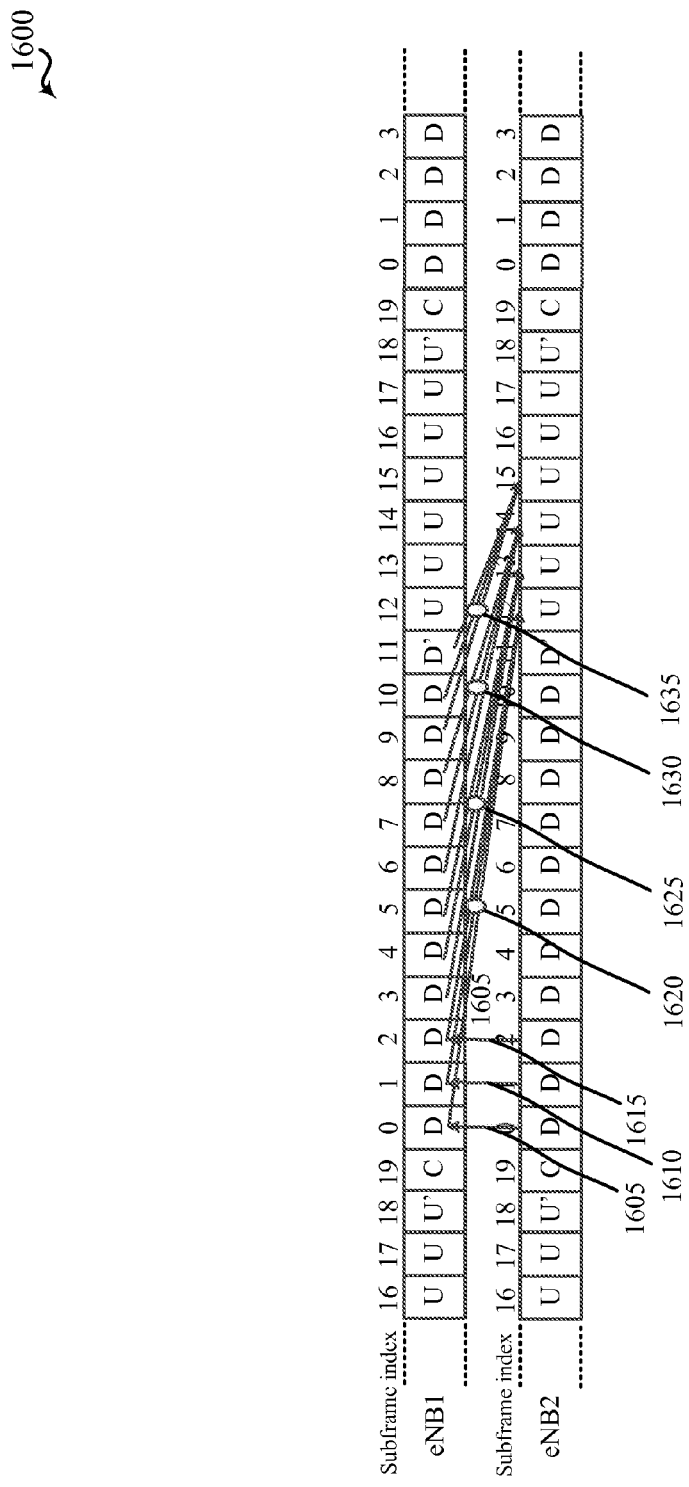
FIG. 16 shows an example of cross-carrier scheduling of CCs of the unlicensed radio frequency spectrum band subframes SF0 through SF19 shown in FIG. 14 or 15, in accordance with various aspects of the present disclosure.

FIGS. 14-16 illustrate an exemplary 0.5 ms subframe structure that may be used, for example, in a carrier aggregation mode or standalone mode of an LTE deployment of an unlicensed radio frequency spectrum band, in accordance with various aspects of the present disclosure. In some cases, the subframe structure shown in FIGS. 14-16 may be used as the second subframe structure having the second subframe duration with respect to one or more of the apparatuses 405 and/or 505 described with reference to FIGS. 4 and/or 5, one or more of the eNBs 705 and/or 905 described with reference to FIGS. 7 and/or 9, and/or one or more of the UEs 815 and/or 915 described with reference to FIGS. 8 and/or 9.

FIG. 14 illustrates an example 1400 of a periodic gating interval 1405 usable for the transmission of downlink subframes in a carrier aggregation or standalone mode of an LTE deployment of an unlicensed radio frequency spectrum band, in accordance with various aspects of the present disclosure. The periodic gating interval 1405 may be used by both eNBs and UEs that support LTE deployments of an unlicensed radio frequency spectrum band. Examples of such eNBs may be the eNBs 105, 205, 705, and/or 905 described with reference to FIGS. 1, 2A, 2B, 7, and 9. Examples of such UEs may be the UEs 115, 215, 815, and 915 described with reference to FIGS. 1, 2A, 2B, 8, and/or 9.

By way of example, the duration of the periodic gating interval 1405 may be equal to (or approximately equal to) the duration of an LTE/LTE-A radio frame. In some cases, the boundaries of the periodic gating interval 1405 may be synchronized with (e.g., aligned with) the boundaries of the LTE/LTE-A radio frame.

The periodic gating interval 1405 may include a number of subframes (e.g., twenty subframes labeled SF0, SF1, SF19), which subframes may be defined by a subframe structure having a 0.5 millisecond subframe duration. Subframes SF0 through SF9 may be downlink (D) subframes 1410, subframe SF10 may be a special downlink (D') subframe 1415, subframe SF11 may be a CCA (C) subframe 1420, subframes SF12 through SF17 may be uplink (U) subframes 1425, subframe SF18 may be a special uplink (U') subframe 1430, and SF19 may be a CCA (C) subframe 1435.

The U' subframe 1430 may provide a partial uplink subframe wherein the last symbol of the subframe may be used as a CCA slot 1440. The C subframe 1435 may include up to six CCA slots 1440. Each of a number of eNBs contending for a particular channel of the unlicensed radio frequency spectrum band may perform a DCCA 1445 using one of the CCA slots 1440. Each CCA slot 1440 may coincide with an OFDM symbol position having a duration of roughly 1/14 milliseconds.

In some cases, different ones of the CCA slots 1440 may be pseudo-randomly identified or selected by an eNB in different occurrences of the C subframe 1435 (i.e., in different C subframes used to perform a DCCA 1445 for different transmission intervals of the unlicensed radio frequency spectrum band). The pseudo-random identification or selection of CCA slots 1440 may be controlled using a hopping sequence. In other cases, the same CCA slot 1440 may be selected by an eNB in different occurrences of the C subframe.

The eNBs of a wireless communications system may be operated by the same or different operators. In some embodiments, eNBs operated by different operators may select different ones of the CCA slots 1440 in a particular C subframe 1435, thereby avoiding CCA collisions between different operators. If the pseudo-random selection mechanisms of different operators are coordinated, CCA slots 1440 may be pseudo-randomly selected by a plurality of different operators such that the eNBs of the different operators each have an equal opportunity to perform a DCCA 1445 in the earliest CCA slot 1440 of particular transmission intervals. Thus, over time, the eNBs of the different operators may each have an opportunity to perform a DCCA 1445 first and gain access to a transmission interval of the unlicensed radio frequency spectrum band regardless of the needs of eNBs of other operators.

When an eNB's DCCA 1445 indicates that a channel is available, but the eNB's DCCA 1445 is completed before the end of the periodic gating interval 1405, the eNB may transmit one or more signals to reserve the channel until the end of the periodic gating interval 1405. The one or more signals may in some cases include CUPS, CUBS 1450, and/or a CRS. CUPS, CUBS 1450, and/or a CRS may be used for both channel synchronization and channel reservation. That is, a device that performs a CCA for the channel after another eNB begins to transmit CUPS, CUBS 1450, or a CRS on the channel may detect the energy of the CUPS, CUBS 1450, or the CRS and determine that the channel is currently unavailable.

Following an eNB's successful completion of CCA for a channel and/or the transmission of CUPS, CUBS 1450, or a CRS over the channel, the eNB may use the channel for up to a predetermined period of time (e.g., a portion of an LTE/LTE-A radio frame) to transmit a waveform (e.g., an LTE-based waveform 1455).

FIG. 15 illustrates an example 1500 of a periodic gating interval 1505 usable for the transmission of uplink subframes in a carrier aggregation or standalone mode of an LTE deployment of an unlicensed radio frequency spectrum band, in accordance with various aspects of the present disclosure. The periodic gating interval 1505 may be used by both eNBs and UEs that support LTE deployments of unlicensed radio frequency spectrum bands. Examples of such eNBs may be the eNBs 105, 205, 705, and 905 described with reference to FIGS. 1, 2A, 2B, 7, and/or 9. Examples of such UEs may be the UEs 115, 215, 815, and 915 described with reference to FIGS. 1, 2A, 2B, 8, and/or 9.

By way of example, the duration of the periodic gating interval 1505 may be equal to (or approximately equal to) the duration of an LTE/LTE-A radio frame.

The periodic gating interval 1505 may include a number of subframes (e.g., twenty subframes labeled SF0, SF1, . . . , SF19), which subframes may be defined by a subframe structure having a 0.5 millisecond subframe duration. Subframes SF0 through SF9 may be downlink (D) subframes 1410, subframe SF10 may be a special downlink (D') subframe 1415, subframe SF11 may be a CCA (C) subframe 1420, subframes SF12 through SF17 may be uplink (U) subframes 1425, subframe SF18 may be a special uplink (U') subframe 1430, and SF19 may be a CCA (C) subframe 1435.

The D' subframe 1415 may provide a guard period wherein the last symbol of the subframe may be used as a CCA slot 1510. The C subframe 1420 may include up to six CCA slots 1510. Each of a number of eNBs contending for a particular channel of the unlicensed radio frequency spectrum band may perform an uplink CCA (UCCA 1515) using one of the CCA slots 1510. Each CCA slot 1510 may coincide with an OFDM symbol position having a duration of roughly 1/14 millisecond.

In some cases, different ones of the CCA slots 1510 may be pseudo-randomly identified or selected by an eNB in different occurrences of the C subframe 1420 (i.e., in different C subframes used to perform an UCCA 1515 for different transmission intervals of the unlicensed radio frequency spectrum band). The pseudo-random identification or selection of CCA slots 1510 may be controlled using a hopping sequence. In other cases, the same CCA slot 1510 may be selected by an eNB in different occurrences of the C subframe.

The eNBs of a wireless communications system may be operated by the same or different operators. In some embodiments, eNBs operated by different operators may select different ones of the CCA slots 1510 in a particular C subframe 1420, thereby avoiding CCA collisions between different operators. If the pseudo-random selection mechanisms of different operators are coordinated, CCA slots 1510 may be pseudo-randomly selected by a plurality of different operators such that the eNBs of the different operators each have an equal opportunity to perform an UCCA 1515 in the earliest CCA slot 1510 of particular transmission intervals. Thus, over time, the eNBs of the different operators may each have an opportunity to perform an UCCA 1515 first and gain access to a transmission interval of the unlicensed radio frequency spectrum band regardless of the needs of eNBs of other operators.

When an eNB's UCCA 1515 indicates that a channel is available, but the eNB's UCCA 1515 is completed before the end of the periodic gating interval 1505, the eNB may transmit one or more signals to reserve the channel until the end of the periodic gating interval 1505. The one or more signals may in some cases include uplink CUPS (UCUPS), uplink CUBS (UCUBS 1520), and/or a CRS. UCUPS, UCUBS 1520, and/or a CRS may be used for both channel synchronization and channel reservation. That is, a device that performs a CCA for the channel after another eNB begins to transmit UCUPS, UCUBS 1520, or a CRS on the channel may detect the energy of the UCUPS, UCUBS 1520, or the CRS and determine that the channel is currently unavailable.

Following an eNB's successful completion of CCA for a channel and/or the transmission of UCUPS, UCUBS 1520, or a CRS over the channel, the eNB may use the channel for up to a predetermined period of time (e.g., a portion of an LTE/LTE-A radio frame) to transmit a waveform (e.g., an LTE-based waveform 1525).

FIG. 16 shows an example 1600 of cross-carrier scheduling of CCs of the unlicensed radio frequency spectrum band subframes SF0 through SF19 shown in FIG. 14 or 15, in accordance with various aspects of the present disclosure. In one example, cross-carrier scheduling may be performed within the CCs of the subframes of the second subframe structure (e.g., scheduling may be done on a per subframe basis, as illustrated by the upward pointing arrows 1605, 1610, and/or 1615. Alternately, CCs of the unlicensed radio frequency spectrum band subframes SF0 through SF19 may be scheduled as described with reference to FIGS. 11 and/or 12.

FIG. 16 also shows an example of ACK/NACK feedback transmissions for the unlicensed radio frequency spectrum band subframes SF0 through SF19. By way of example, two or more downlink subframes (e.g., SF0, SF1, and SF2 of the unlicensed radio frequency spectrum band eNB) may be mapped to a single unlicensed radio frequency spectrum band uplink subframe, as indicated by the set of arrows 1620. Additional groups of downlink subframes may be mapped to other unlicensed radio frequency spectrum band uplink subframes, as indicated by the sets of arrows 1625, 1630, and/or 1635. In some cases, the ACK/NACK feedback transmissions of the two or more unlicensed radio frequency spectrum band subframes mapped to a single unlicensed radio frequency spectrum band uplink subframe may be time-domain bundled (e.g., to reduce the ACK/NACK feedback payload). In other cases, the ACK/NACK feedback transmissions may not be time-domain bundled.

Figure 17A:
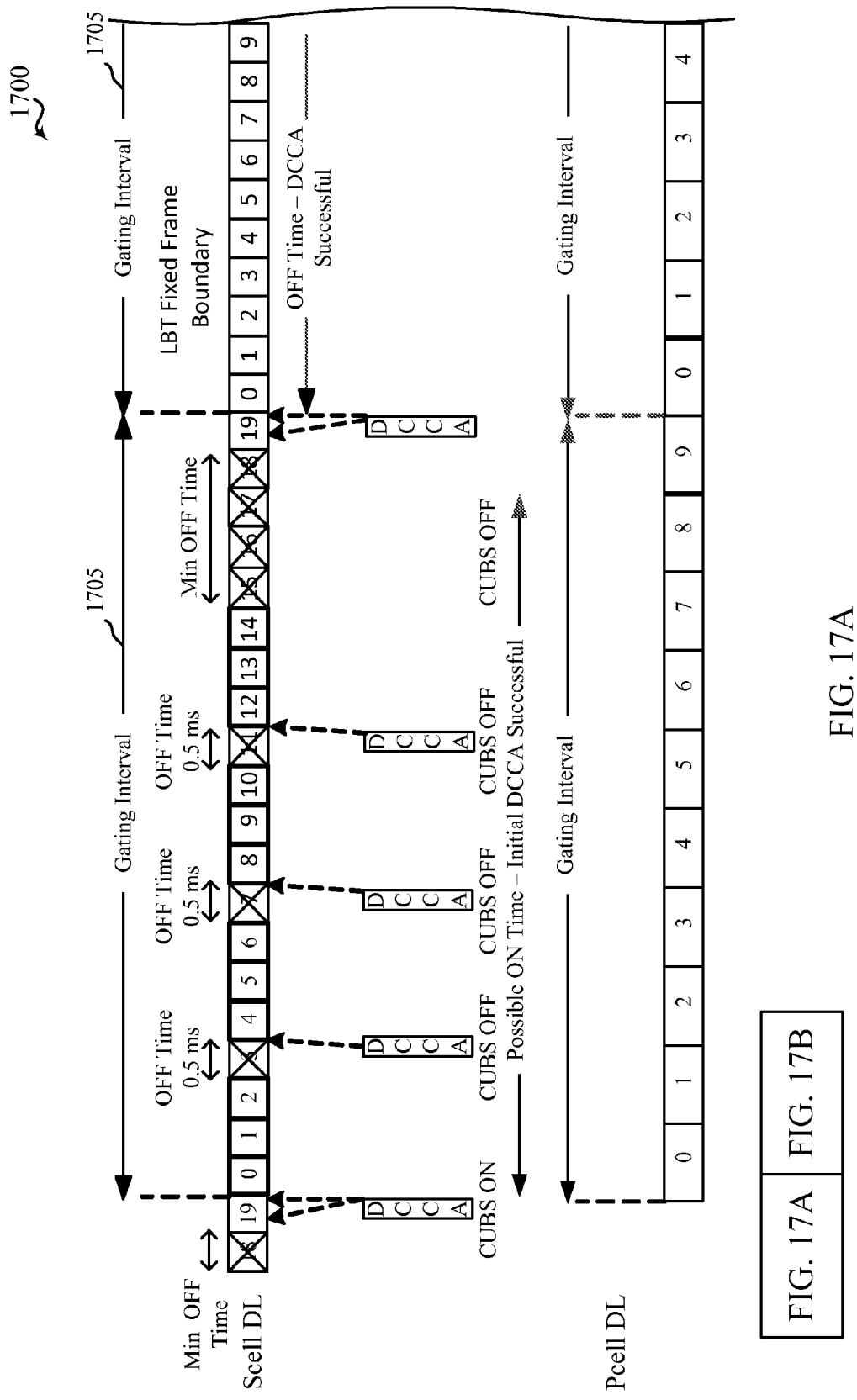
FIGS. 17A and 17B illustrate an example of a periodic gating interval usable for radar detection, in accordance with various aspects of the present disclosure.
Figure 17B:
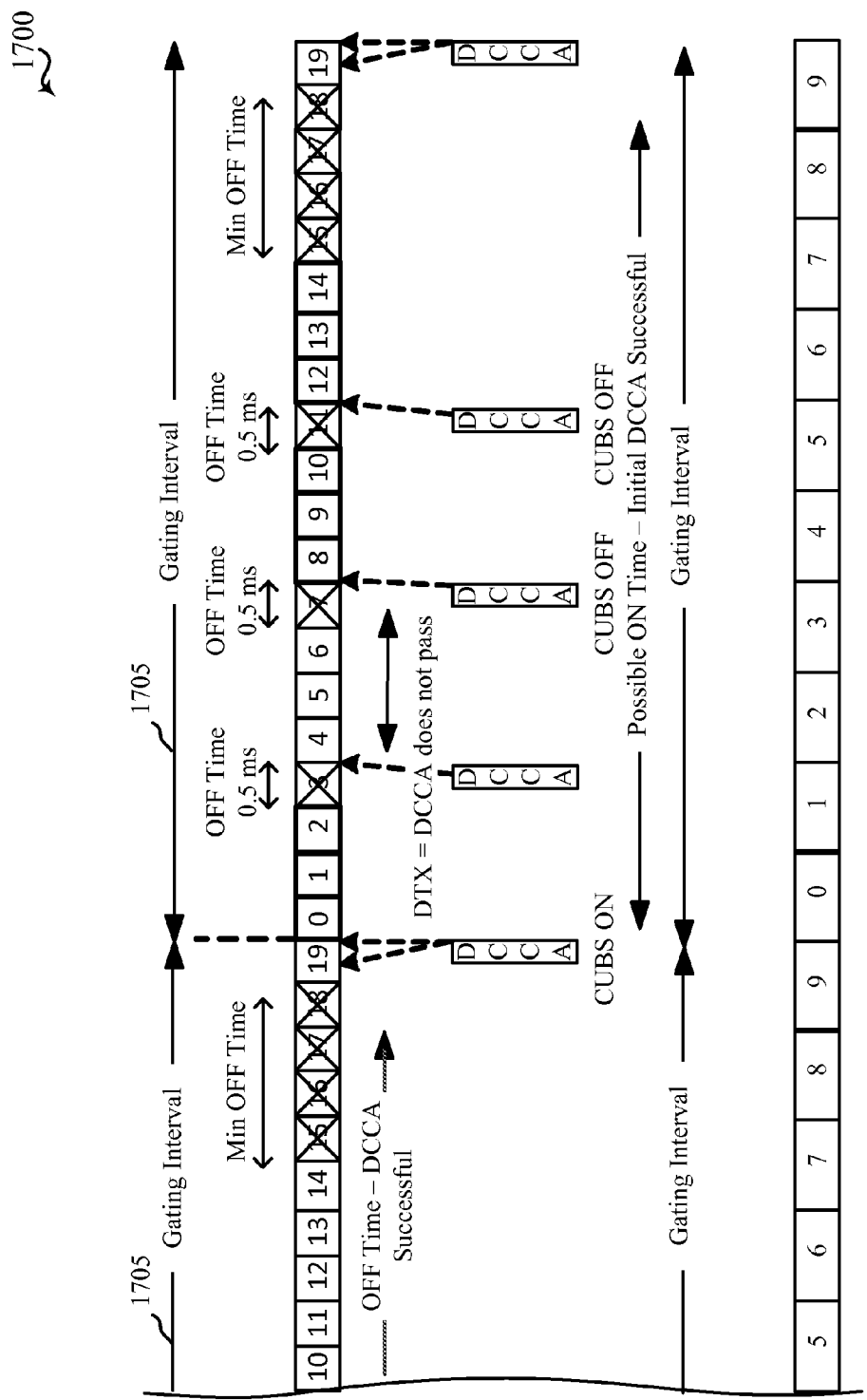

FIGS. 17A and 17B illustrate an example 1700 of a periodic gating interval 1705 usable for radar detection, in accordance with various aspects of the present disclosure. The periodic gating interval 1705 may be used by both eNBs and UEs that support unlicensed radio frequency spectrum band. Examples of such eNBs may be the eNBs 105, 205, 705, and 905 described with reference to FIGS. 1, 2A, 2B, 7, and 9. Examples of such UEs may be the UEs 115, 215, 815, and 915 described with reference to FIGS. 1, 2A, 2B, 8, and 9. By way of example, the periodic gating interval 1705 may be based on a 0.5 ms subframe structure.

By way of example, the duration of the periodic gating interval 1705 may be equal to (or approximately equal to) the duration of an LTE/LTE-A radio frame. In some cases, the boundaries of the periodic gating interval 1705 may be synchronized with (e.g., aligned with) the boundaries of the LTE/LTE-A radio frame.

The periodic gating interval 1705 may include a number of subframes (e.g., twenty subframes labeled SF0, SF1, SF19), which subframes may be defined by a subframe structure having a 0.5 millisecond subframe duration. Subframes SF0 through SF2, SF4 through SF6, SF8 through SF10, and SF12 through SF14 may be used for radar detection, while subframes SF3, SF7, SF11 and SF19 may be used to contend for channel access and perform a CCA.

In accordance with radar test waveforms specified in the United States by the Federal Communications Commission (FCC), a channel of a carrier should be monitored for at least 0.5 milliseconds after 1.5 milliseconds of transmission in order to detect the presence of radar types 2, 3, or 4. Additionally, the channel of the carrier should be monitored for at least 2.0 milliseconds after 7.5 milliseconds of transmission in order to detect the presence of radar types 1 or 5. According to some embodiments, as will be described in more detail below, an eNB or UE may perform a CCA procedure in discontinuous transmission (DTX) periods that correspond to the tones of the channel of the radio frequency spectrum that should be monitored. In this regard, FIGS. 17A and 17B show DCCA being performed in various subframes of the periodic gating interval 1705.

In order to transmit during a periodic gating interval 1705, an eNB or UE may need to be successful during a first CCA attempt for the periodic gating interval 1705. Otherwise, and as shown in the period gating interval 1705 spanning FIGS. 17A and 17B, the eNB or UE may need to wait until a next periodic gating interval to perform a CCA.

Figure 18:
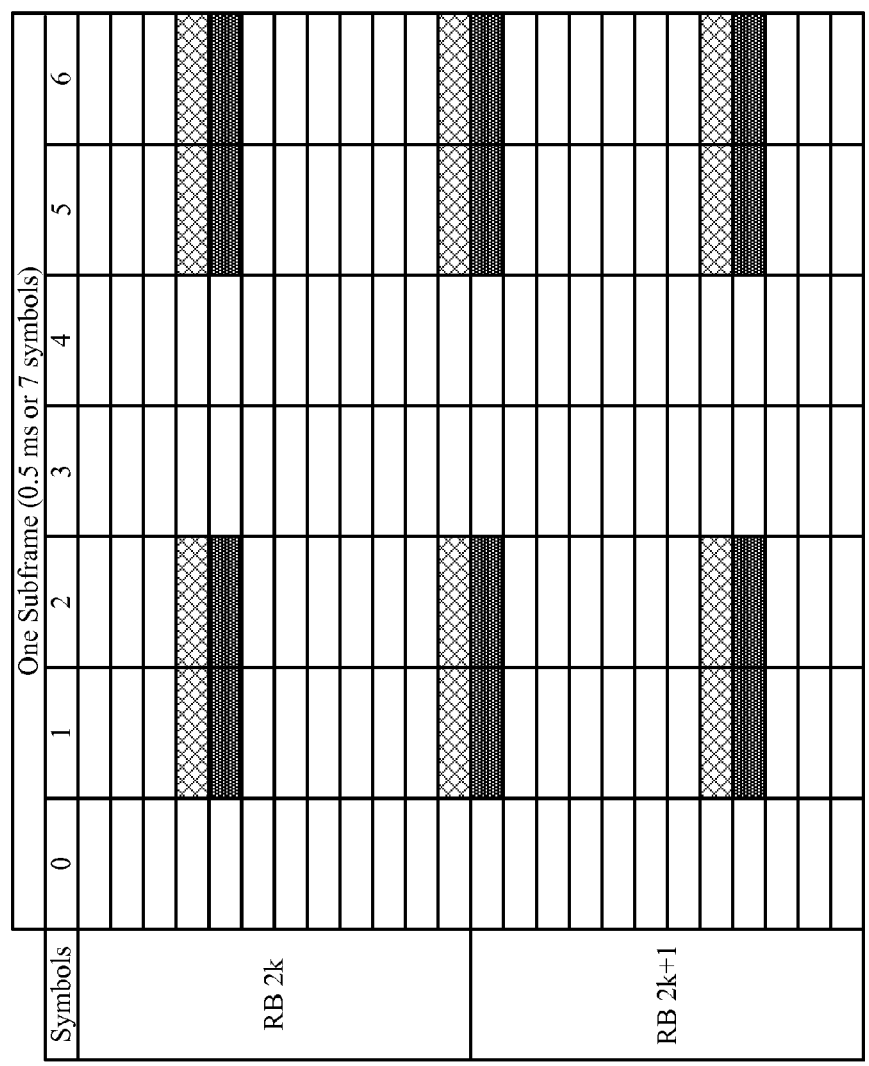
FIG. 18 illustrates the generation of a DM-RS pattern for a downlink subframe or an uplink subframe of a subframe structure having a 0.5 millisecond subframe duration for communicating in a second carrier, in accordance with various aspects of the present disclosure.

FIG. 18 illustrates the generation of a DM-RS pattern for a downlink subframe or an uplink subframe of a subframe structure having a 0.5 millisecond subframe duration for communicating in a second carrier, in accordance with various aspects of the present disclosure. For example, DL DM-RS for the LTE/LTE-A radio frequency spectrum band may be present in the last two symbols of 0.5 millisecond of the first subframe structure having a first subframe duration, while UL DM-RS for PUSCH for the LTE/LTE-A radio frequency spectrum band may be present in the middle symbol. A DL DM-RS pattern for the unlicensed radio frequency spectrum band may be based on two RBs (e.g., two adjacent RBs) of a subframe structure having a second subframe duration, and similar to in the LTE/LTE-A radio frequency spectrum band (where a DM-RS pattern may be specified over 1 RB×2 (0.5 ms)), up to rank 8 PDSCH transmissions can be supported in the unlicensed radio frequency spectrum band while maintaining a similar DM-RS overhead (where a DM-RS pattern may be specified over 2 RBs×1 (0.5 ms)). In addition, in order to minimize tone gaping between two adjacent frequency blocks for improved multipath delay handling, a new DL DM-RS pattern may be frequency-staggered for at least low ranks (e.g., staggering may be used for ranks 1 and 2, but not for ranks 3 and above). A similar new UL DM-RS pattern may also be used. Multi-subframe DM-RS bundling may also be employed, in which case a same precoding may be applied across two or more subframes such that joint channel estimation based on the two or more subframes can be performed for improved channel estimation.

A CSI-RS pattern for a subframe structure having a 0.5 millisecond subframe duration for communicating in a second carrier may also be based on two adjacent RBs, with one RE/RB per CSI-RS port (though the density may be increased). The CSI-RS RBs may need to be placed in different symbols compared to CSI-RS used in an LTE/LTE-A system, especially when a new DM-RS pattern is used in the unlicensed radio frequency spectrum band, such as in symbols 3 and 4.

If a two RB DM-RS pattern is adopted, joint channel estimation may be made for each two RBs (e.g., each DRB).

In some cases, the same sequence generation technique may be used for both a one millisecond subframe structure and a 0.5 millisecond subframe structure, with each 0.5 millisecond subframe structure being treated as a slot of an LTE/LTE-A subframe for purposes of sequence generation.

In some embodiments, the same minimum hybrid automatic repeat request (HARQ) timing requirements may be maintained for all modes of operation (e.g., supplemental downlink mode, carrier aggregation mode, and standalone mode) of an eNB or UE. However, from a UE perspective, there may be multiple UE HARQ capabilities, such as capabilities to support 2 millisecond, 3 millisecond, and/or 4 millisecond HARQ ACK timing. In such cases, a UE may indicate its capability, and an eNB may schedule the UE HARQ accordingly.

When the second duration of the second subframe structure is less than the first duration of the first subframe structure, an uplink subframe power control may have to be adjusted for subframes having the second subframe structure (e.g., given the same modulation and coding scheme (MCS) and same target performance). This may be addressed, for example, by an open loop power control configuration.

Also when the second duration of the second subframe structure is less than the first duration of the first subframe structure, and when the second subframe structure is an unlicensed radio frequency spectrum band uplink subframe structure, the uplink subframe structure may have a shortend duration when a last symbol of the uplink subframe structure is used for a sounding reference signal (SRS).

Figure 19:
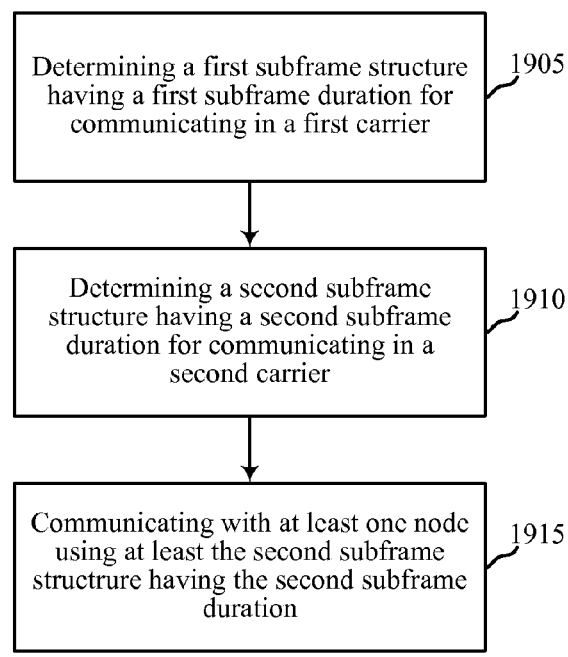
FIG. 19 is a flowchart illustrating an example of a method for wireless communications, in accordance with various aspects of the present disclosure.

FIG. 19 is a flow chart illustrating an example of a method 1900 for wireless communications, in accordance with various aspects of the present disclosure. For clarity, the method 1900 is described below with reference to aspects of one or more of the apparatuses 405 and/or 505 described with reference to FIGS. 4 and/or 5, one or more of the eNBs 105, 205, 705, and/or 905 described with reference to FIGS. 1, 2A, 2B, 7, and/or 9, and/or one or more of the UEs 115, 215, 815, and/or 915 described with reference to FIGS. 1, 2A, 2B, 8, and/or 9. In some embodiments, an apparatus, eNB, or UE, such as one of the apparatuses 405, 505, eNBs 105, 205, 705, 905, and/or UEs 115, 215, 815, 915 may execute one or more sets of codes to control the functional elements of the apparatus, eNB, or UE to perform the functions described below.

At block 1905, a first subframe structure having a first subframe duration for communicating in a first carrier may be determined. The operation(s) at block 1905 may in some cases be performed using the communication management module 415, 515, 790, 860, 941, and/or 981 described with reference to FIGS. 4, 5, 7, 8, and/or 9, and/or the first radio frequency spectrum band communication management module 525 and/or 610 described with reference to FIGS. 5 and/or 6.

At block 1910, a second subframe structure having a second subframe duration for communicating in a second carrier may be determined. The operation(s) at block 1910 may in some cases be performed using the communication management module 415, 515, 790, 860, 941, and/or 981 described with reference to FIGS. 4, 5, 7, 8, and/or 9, and/or the second radio frequency spectrum band communication management module 530 and/or 615 described with reference to FIGS. 5 and/or 6.

At block 1915, an apparatus, eNB, or UE may communicate with at least one node using at least the second subframe structure having the second subframe duration. The node with which the apparatus, eNB, or UE communicates may be another apparatus, eNB, or UE. The operation(s) at block 1915 may in some cases be performed using the communication management module 415, 515, 790, 860, 941, and/or 981 described with reference to FIGS. 4, 5, 7, 8, and/or 9, and/or the second radio frequency spectrum band communication management module 530 and/or 615 described with reference to FIGS. 5 and/or 6.

In some embodiments, the first carrier may be in an LTE/LTE-A and/or licensed radio frequency spectrum band, and the second carrier may be in an unlicensed radio frequency spectrum band, as described, for example, with reference to any of FIGS. 10-16, 17A, 17B, and/or 18.

In some embodiments, the second subframe duration may be less than the first subframe duration. For example, the first subframe duration may be a one millisecond subframe duration, and the second subframe duration may be a 0.5 millisecond subframe duration, as described, for example, with reference to any of FIGS. 10-16, 17A, 17B, and/or 18. In some cases, a number of downlink subframes may be transmitted (e.g., from an eNB to a UE) or received (e.g., at the UE from the eNB) using the second subframe structure having the second subframe duration, and a number of uplink subframes may be transmitted (e.g., from the UE to the eNB) or received (e.g., at the eNB from the UE) using the first subframe structure having the first subframe duration, with the second subframe duration being less than the first subframe duration.

In some embodiments, a first channel may be transmitted in the first carrier using the first subframe duration, and a second channel may be transmitted in the second carrier using the second subframe duration, as described, for example, with reference to any of FIGS. 10, 14, 17A, and/or 17B. The first channel and the second channel may in some cases be transmitted from an eNB to at least one UE.

In some embodiments, a first channel may be received in the first carrier using the first subframe duration, and a second channel may be received in the second carrier using the second subframe duration, as described, for example, with reference to any of FIGS. 10, 14, 17A, and/or 17B. The first channel and the second channel may in some cases be received from an eNB at a UE.

Each of the first subframe structure and the second subframe structure may include one or more uplink subframes and/or one or more downlink subframes. In some embodiments, a type of channel to be transmitted may be identified, and the channel may be transmitted in an uplink subframe using either the first subframe duration or the second subframe duration, wherein the subframe duration that is used is based at least in part on the identified type of channel. That is, the subframe duration of an uplink subframe may be channel dependent (e.g., PUSCH may have an uplink subframe with a subframe duration of one millisecond, while PUCCH may have an uplink subframe with a subframe duration of 0.5 milliseconds (at least when PUCCH carries ACKs/NACKs, to support better DL HARQ operation; however, PUCCH may have an uplink subframe with a subframe duration of one millisecond when it carries CQI)).

In some embodiments, an indicator may be broadcast (e.g., broadcast or groupcast) to indicate a subframe duration during a subsequent period of communications. For example, a bit of EPBCH may be used to indicate whether, for the next 80 milliseconds, the subframe duration will be 0.5 milliseconds or one millisecond. This may be particularly useful for CET transmissions.

In some embodiments, at least one indication may be transmitted or received to indicate whether at least one downlink channel and/or at least one uplink channel will be based on the first subframe structure having the first subframe duration or on the second subframe structure having the second subframe duration. In some cases, and by way of example, a UE may be semi-statically configured with information indicating the subframe structure on which an uplink channel and/or a downlink channel is based. In other cases, and by way of further example, a UE may be dynamically provided an indication of the subframe structure on which an uplink channel and/or a downlink channel is based. In one example, a bit of DCI may be used to indicate whether a PDSCH is based on the first subframe structure having the first subframe duration or the second subframe structure having the second subframe duration.

In some embodiments, an indication of whether a downlink channel or an uplink channel is based on the first subframe structure having the first subframe duration or on the second subframe structure having the second subframe duration may be implicit. For example, a UE may detect a subframe duration of a downlink control channel (e.g., 0.5 milliseconds or one millisecond) and determine a subframe duration of a downlink shared channel (e.g., PDSCH) based at least in part on the subframe duration of the downlink control channel.

The method 1900 may be performed in various contexts, such as, in a supplemental downlink mode, in a carrier aggregation mode, or in a standalone mode of operation when the second carrier is in an unlicensed radio frequency spectrum band. For example, the first carrier may be determined as a primary component carrier in an LTE/LTE-A and/or licensed radio frequency spectrum band, and the second carrier may be determined as a secondary component carrier in an unlicensed radio frequency spectrum band. In some cases, the second carrier may operate as a supplemental downlink to the primary component carrier. In some cases, the first carrier and the second carrier may be part of a carrier aggregation operation. In some cases, the first carrier and the second carrier may be part of a dual-connectivity operation.

Thus, the method 1900 may provide for wireless communications. It should be noted that the method 1900 is just one implementation and that the operations of the method 1900 may be rearranged or otherwise modified such that other implementations are possible.

Figure 20:
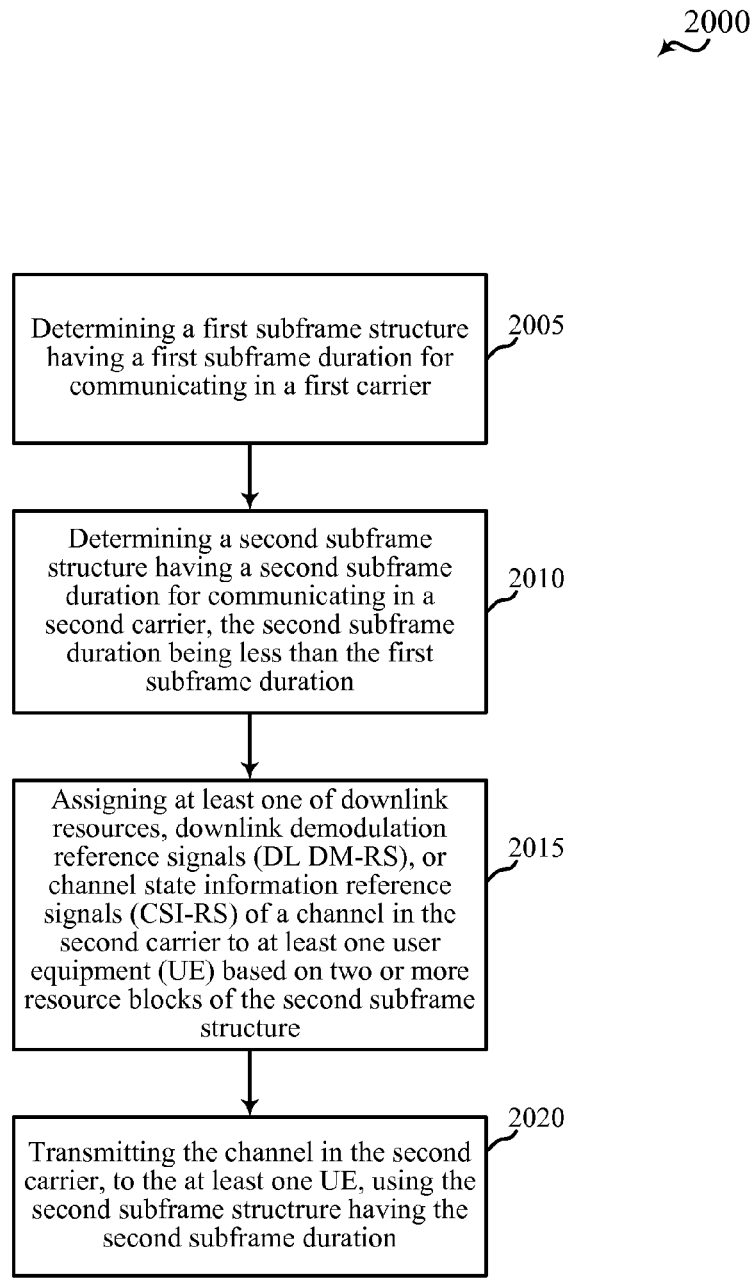
FIG. 20 is a flowchart illustrating another example of a method for wireless communications, in accordance with various aspects of the present disclosure.

FIG. 20 is a flow chart illustrating another example of a method 2000 for wireless communications, in accordance with various aspects of the present disclosure. For clarity, the method 2000 is described below with reference to aspects of one or more of the apparatuses 405 and/or 505 described with reference to FIGS. 4 and/or 5, one or more of the eNBs 105, 205, 705, and/or 905 described with reference to FIGS. 1, 2A, 2B, 7, and/or 9, and/or one or more of the UEs 115, 215, 815, and/or 915 described with reference to FIGS. 1, 2A, 2B, 8, and/or 9. In some embodiments, an apparatus, eNB, or UE, such as one of the apparatuses 405, 505, eNBs 105, 205, 705, 905, and/or UEs 115, 215, 815, 915 may execute one or more sets of codes to control the functional elements of the apparatus, eNB, or UE to perform the functions described below.

At block 2005, a first subframe structure having a first subframe duration for communicating in a first carrier may be determined. The operation(s) at block 2005 may in some cases be performed using the communication management module 415, 515, 790, 860, 941, and/or 981 described with reference to FIGS. 4, 5, 7, 8, and/or 9, and/or the first radio frequency spectrum band communication management module 525 and/or 610 described with reference to FIGS. 5 and/or 6.

At block 2010, a second subframe structure having a second subframe duration for communicating in a second carrier may be determined. The second subframe duration may be less than the first subframe duration. The operation(s) at block 2010 may in some cases be performed using the communication management module 415, 515, 790, 860, 941, and/or 981 described with reference to FIGS. 4, 5, 7, 8, and/or 9, and/or the second radio frequency spectrum band communication management module 530 and/or 615 described with reference to FIGS. 5 and/or 6.

At block 2015, at least one of downlink resources, downlink demodulation reference signals (DL DM-RS), or channel state information reference signals (CSI-RS) of a channel in the second carrier may be assigned to at least one UE based on two or more RBs of the second subframe structure. The operation(s) at block 2015 may in some cases be performed using the communication management module 415, 515, 790, 860, 941, and/or 981 described with reference to FIGS. 4, 5, 7, 8, and/or 9, and/or the resource allocation and assignment module 630 described with reference to FIG. 6.

At block 2020, an apparatus or eNB may transmit the channel in the second carrier, to the at least one UE, using the second subframe structure having the second subframe duration. The operation(s) at block 2020 may in some cases be performed using the communication management module 415, 515, 790, 860, 941, and/or 981 described with reference to FIGS. 4, 5, 7, 8, and/or 9, and/or the second radio frequency spectrum band communication management module 530 and/or 615 described with reference to FIGS. 5 and/or 6.

In some embodiments, the first carrier may be in an LTE/LTE-A and/or licensed radio frequency spectrum band, and the second carrier may be in an unlicensed radio frequency spectrum band, as described, for example, with reference to any of FIGS. 10-16, 17A, 17B, and/or 18.

In some embodiments, the first subframe duration may be a one millisecond subframe duration, and the second subframe duration may be a 0.5 millisecond subframe duration, as described, for example, with reference to any of FIGS. 10-16, 17A, 17B, and/or 18. In some cases, a number of downlink subframes may be transmitted (e.g., from an eNB to a UE) or received (e.g., at the UE from the eNB) using the second subframe structure having the second subframe duration, and a number of uplink subframes may be transmitted (e.g., from the UE to the eNB) or received (e.g., at the eNB from the UE) using the first subframe structure having the first subframe duration, with the second subframe duration being less than the first subframe duration.

In some embodiments, DL DM-RS and/or CSI-RS of the channel may each be assigned based on two or more RBs of the second subframe structure, as described, for example, with reference to FIG. 18.

The method 2000 may be performed in various contexts, such as, in a supplemental downlink mode, in a carrier aggregation mode, or in a standalone mode of operation when the second carrier is in an unlicensed radio frequency spectrum band. For example, the first carrier may be determined as a primary component carrier in an LTE/LTE-A and/or licensed radio frequency spectrum band, and the second carrier may be determined as a secondary component carrier in an unlicensed radio frequency spectrum band. In some cases, the second carrier may operate as a supplemental downlink to the primary component carrier. In some cases, the first carrier and the second carrier may be part of a carrier aggregation operation. In some cases, the first carrier and the second carrier may be part of a dual-connectivity operation.

Thus, the method 2000 may provide for wireless communications. It should be noted that the method 2000 is just one implementation and that the operations of the method 2000 may be rearranged or otherwise modified such that other implementations are possible.

Figure 21:
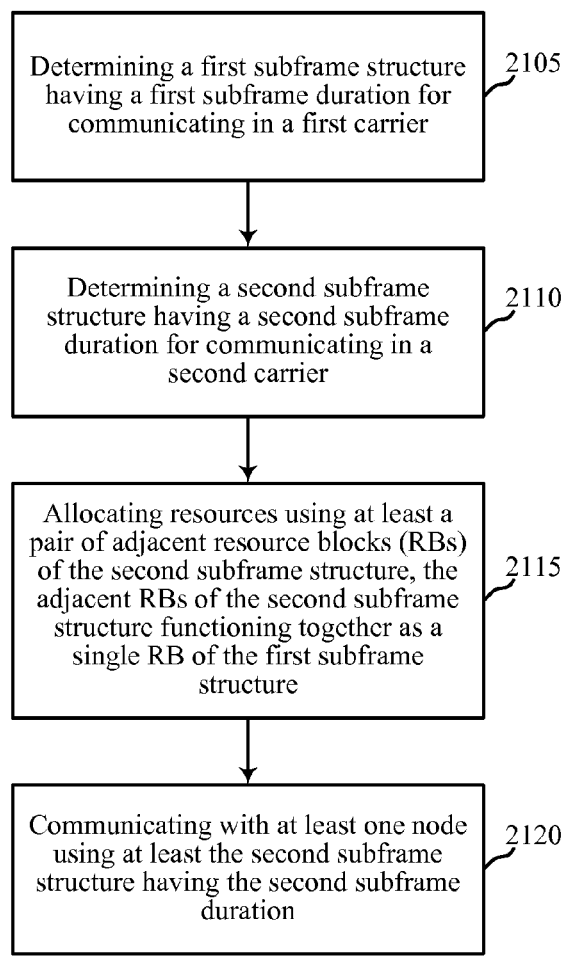
FIG. 21 is a flowchart illustrating another example of a method for wireless communications, in accordance with various aspects of the present disclosure.

FIG. 21 is a flowchart illustrating another example of a method 2100 for wireless communications, in accordance with various aspects of the present disclosure. For clarity, the method 2100 is described below with reference to aspects of one or more of the apparatuses 405 and/or 505 described with reference to FIGS. 4 and/or 5, one or more of the eNBs 105, 205, 705, and/or 905 described with reference to FIGS. 1, 2A, 2B, 7, and/or 9, and/or one or more of the UEs 115, 215, 815, and/or 915 described with reference to FIGS. 1, 2A, 2B, 8, and/or 9. In some embodiments, an apparatus, eNB, or UE, such as one of the apparatuses 405, 505, eNBs 105, 205, 705, 905, and/or UEs 115, 215, 815, 915 may execute one or more sets of codes to control the functional elements of the apparatus, eNB, or UE to perform the functions described below.

At block 2105, a first subframe structure having a first subframe duration for communicating in a first carrier may be determined. The operation(s) at block 2105 may in some cases be performed using the communication management module 415, 515, 790, 860, 941, and/or 981 described with reference to FIGS. 4, 5, 7, 8, and/or 9, and/or the first radio frequency spectrum band communication management module 525 and/or 610 described with reference to FIGS. 5 and/or 6.

At block 2110, a second subframe structure having a second subframe duration for communicating in a second carrier may be determined. The operation(s) at block 2110 may in some cases be performed using the communication management module 415, 515, 790, 860, 941, and/or 981 described with reference to FIGS. 4, 5, 7, 8, and/or 9, and/or the second radio frequency spectrum band communication management module 530 and/or 615 described with reference to FIGS. 5 and/or 6.

At block 2115, resources may be allocated using at least a pair of adjacent RBs of the second subframe structure. The adjacent RBs of the second subframe structure may function together as a single RB of the first subframe structure. The operation(s) at block 2115 may in some cases be performed using the communication management module 415, 515, 790, 860, 941, and/or 981 described with reference to FIGS. 4, 5, 7, 8, and/or 9, and/or the resource allocation and assignment module 630 described with reference to FIG. 6.

At block 2120, an apparatus, eNB, or UE may communicate with at least one node using at least the second subframe structure having the second subframe duration. The node with which the apparatus, eNB, or UE communicates may be another apparatus, eNB, or UE. The operation(s) at block 2120 may in some cases be performed using the communication management module 415, 515, 790, 860, 941, and/or 981 described with reference to FIGS. 4, 5, 7, 8, and/or 9, and/or the second radio frequency spectrum band communication management module 530 and/or 615 described with reference to FIGS. 5 and/or 6.

In some embodiments, the first carrier may be in an LTE/LTE-A and/or licensed radio frequency spectrum band, and the second carrier may be in an unlicensed radio frequency spectrum band, as described, for example, with reference to any of FIGS. 10-16, 17A, 17B, and/or 18.

In some embodiments, the second subframe duration may be less than the first subframe duration. For example, the first subframe duration may be a one millisecond subframe duration, and the second subframe duration may be a 0.5 millisecond subframe duration, as described, for example, with reference to any of FIGS. 10-16, 17A, 17B, and/or 18. In some cases, a number of downlink subframes may be transmitted (e.g., from an eNB to a UE) or received (e.g., at the UE from the eNB) using the second subframe structure having the second subframe duration, and a number of uplink subframes may be transmitted (e.g., from the UE to the eNB) or received (e.g., at the eNB from the UE) using the first subframe structure having the first subframe duration, with the second subframe duration being less than the first subframe duration.

In some embodiments, a TBS determination may be performed using at least a pair of adjacent RBs of the second subframe structure. For example, in some cases, a subframe of the first subframe structure may have 100 RBs (e.g., RBS 0-99) and a subframe of the second subframe structure may have 50 double RBs (DRBs 0-49), such that each DRB k corresponds to RB 2 k and RB 2 k+1. In these cases, and assuming for example that the first subframe duration is one millisecond and the second subframe duration is 0.5 milliseconds, the same TBS determination (e.g., TBS lookup) or a similar TBS determination (with minimal changes) may be performed for the first subframe structure and the second subframe structure.

When resources are allocated using only a single RB of the second subframe structure (e.g., not using at least a pair of adjacent RBs of the second subframe structure), the TBS determination performed for the second subframe structure may need to be adjusted compared to the TBS determination performed for the first subframe structure. For example, a number of assigned RBs may need to be multiplied by a factor based on the second subframe duration to produce an index, with the index being used to perform a TBS determination similarly to the TBS determination performed for the first subframe structure. When the first subframe duration is one millisecond and the second subframe duration is 0.5 milliseconds, the factor may be 0.5.

When RB and DRB resource allocations are respectively used for the first subframe structure and the second subframe structure, a sub-band size for transmitting CSI feedback using the second subframe structure may need to be adjusted compared to a sub-band size for CSI feedback transmitted using the first subframe structure. For example, when the first subframe structure has a one millisecond duration and the first carrier is in an LTE/LTE-A radio frequency spectrum band, an 8 RBsub-band may be used for transmitting CSI feedback, whereas, when the second subframe structure has a 0.5 millisecond duration and the second carrier is in an unlicensed radio frequency spectrum band, the sub-band size for CSI feedback may be adjusted to include a 16 RBsub-band. The sub-band size for CSI feedback using the second subframe structure in the second carrier may alternately be kept the same, but when deriving a CQI index, a reduced number of resource elements (REs) per subframe compared to the second subframe structure may need to be taken into account. The configuration for periodic CQI may remain the same for both the first subframe structure in the first carrier and the second subframe structure in the second carrier.

The method 2100 may be performed in various contexts, such as, in a supplemental downlink mode, in a carrier aggregation mode, or in a standalone mode of operation when the second carrier is in an unlicensed radio frequency spectrum band). For example, the first carrier may be determined as a primary component carrier in an LTE/LTE-A and/or licensed radio frequency spectrum band, and the second carrier may be determined as a secondary component carrier in an unlicensed radio frequency spectrum band. In some cases, the second carrier may operate as a supplemental downlink to the primary component carrier. In some cases, the first carrier and the second carrier may be part of a carrier aggregation operation. In some cases, the first carrier and the second carrier may be part of a dual-connectivity operation.

Thus, the method 2100 may provide for wireless communications. It should be noted that the method 2100 is just one implementation and that the operations of the method 2100 may be rearranged or otherwise modified such that other implementations are possible.

Figure 22:
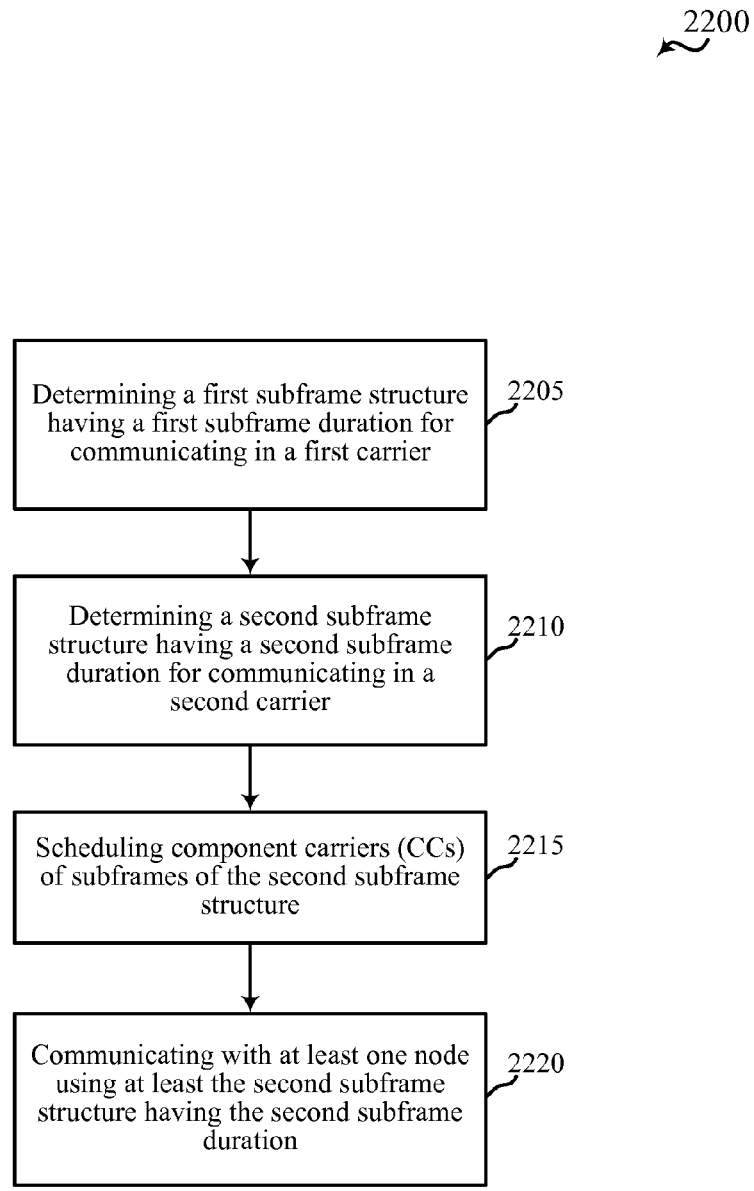
FIG. 22 is a flowchart illustrating another example of a method for wireless communications, in accordance with various aspects of the present disclosure.

FIG. 22 is a flow chart illustrating another example of a method 2200 for wireless communications, in accordance with various aspects of the present disclosure. For clarity, the method 2200 is described below with reference to aspects of one or more of the apparatuses 405 and/or 505 described with reference to FIGS. 4 and/or 5, one or more of the eNBs 105, 205, 705, and/or 905 described with reference to FIGS. 1, 2A, 2B, 7, and/or 9, and/or one or more of the UEs 115, 215, 815, and/or 915 described with reference to FIGS. 1, 2A, 2B, 8, and/or 9. In some embodiments, an apparatus, eNB, or UE, such as one of the apparatuses 405, 505, eNBs 105, 205, 705, 905, and/or UEs 115, 215, 815, 915 may execute one or more sets of codes to control the functional elements of the apparatus, eNB, or UE to perform the functions described below.

At block 2205, a first subframe structure having a first subframe duration for communicating in a first carrier may be determined. The operation(s) at block 2205 may in some cases be performed using the communication management module 415, 515, 790, 860, 941, and/or 981 described with reference to FIGS. 4, 5, 7, 8, and/or 9, and/or the first radio frequency spectrum band communication management module 525 and/or 610 described with reference to FIGS. 5 and/or 6.

At block 2210, a second subframe structure having a second subframe duration for communicating in a second carrier may be determined. The operation(s) at block 2210 may in some cases be performed using the communication management module 415, 515, 790, 860, 941, and/or 981 described with reference to FIGS. 4, 5, 7, 8, and/or 9, and/or the second radio frequency spectrum band communication management module 530 and/or 615 described with reference to FIGS. 5 and/or 6.

At block 2215, component carriers (CCs) of subframes of the second subframe structure may be scheduled. The operation(s) at block 2215 may in some cases be performed using the communication management module 415, 515, 790, 860, 941, and/or 981 described with reference to FIGS. 4, 5, 7, 8, and/or 9, and/or the component carrier scheduling module 635 described with reference to FIG. 6.

At block 2220, an apparatus, eNB, or UE may communicate with at least one node using at least the second subframe structure having the second subframe duration. The node with which the apparatus, eNB, or UE communicates may be another apparatus, eNB, or UE. The operation(s) at block 2220 may in some cases be performed using the communication management module 415, 515, 790, 860, 941, and/or 981 described with reference to FIGS. 4, 5, 7, 8, and/or 9, and/or the second radio frequency spectrum band communication management module 530 and/or 615 described with reference to FIGS. 5 and/or 6.

In some embodiments, the first carrier may be in an LTE/LTE-A and/or licensed radio frequency spectrum band, and the second carrier may be in an unlicensed radio frequency spectrum band, as described, for example, with reference to any of FIGS. 10-16, 17A, 17B, and/or 18.

In some embodiments, the second subframe duration may be less than the first subframe duration. For example, the first subframe duration may be a one millisecond subframe duration, and the second subframe duration may be a 0.5 millisecond subframe duration, as described, for example, with reference to any of FIGS. 10-16, 17A, 17B, and/or 18. In some cases, a number of downlink subframes may be transmitted (e.g., from an eNB to a UE) or received (e.g., at the UE from the eNB) using the second subframe structure having the second subframe duration, and a number of uplink subframes may be transmitted (e.g., from the UE to the eNB) or received (e.g., at the eNB from the UE) using the first subframe structure having the first subframe duration, with the second subframe duration being less than the first subframe duration.

In some embodiments, same-carrier scheduling may be used to schedule the CCs of subframes having the second subframe structure. For example, the CCs of the unlicensed radio frequency spectrum band subframes may be scheduled on a per subframe basis, as described, for example, with reference to FIG. 11. As another example, the CCs of the unlicensed radio frequency spectrum band subframes may be scheduled across subframes or for multiple subframes, e.g., each even unlicensed radio frequency spectrum band subframe may schedule itself and the next odd unlicensed radio frequency spectrum band subframe. EPDCCH may be used for same-carrier scheduling, and may be useful as a result of its finer resource granularity. In some cases, EPDCCH resource allocations/configurations may be made as DRBs.

In some embodiments, cross-carrier scheduling may be used to schedule the CCs of subframes of the second subframe structure. For example, a control channel (e.g., PDCCH or another type of control channel) may be used to cross schedule CCs from subframes based on the first subframe structure to subframes based on the second subframe structure, as described, for example, with reference to FIG. 12. Alternatively, cross-carrier scheduling can be based on an EPDCCH-like structure from subframes based on an LTE/LTE-A subframe structure to subframes based on an unlicensed radio frequency spectrum band subframe structure. If PDCCH is used for cross-carrier scheduling, especially when the scheduling carrier is an unlicensed radio frequency spectrum band carrier (not shown), a PDCCH resource granularity of less than a symbol (e.g., a 0.5 symbol granularity) may be used. Alternately, different resource granularities may be used, such as i) even RBs (or DRBs) in the first symbol, ii) the entire first symbol, or iii) the entire first symbol plus even RBs (or DRBs) in the second symbol. In some cases, one cell may use even RBs (or DRBs) and a different cell may use odd RBs (or DRBs). Alternately, cross-carrier scheduling may be performed within the CCs of the subframes of the second subframe structure, as described, for example, with reference to FIG. 16. Cross-carrier scheduling may provide an opportunity for earlier decoding of subframes.

The method 2200 may be performed in various contexts, such as, in a supplemental downlink mode, in a carrier aggregation mode, or in a standalone mode of operation when the second carrier is in an unlicensed radio frequency spectrum band. For example, the first carrier may be determined as a primary component carrier in an LTE/LTE-A and/or licensed radio frequency spectrum band, and the second carrier may be determined as a secondary component carrier in an unlicensed radio frequency spectrum band. In some cases, the second carrier may operate as a supplemental downlink to the primary component carrier. In some cases, the first carrier and the second carrier may be part of a carrier aggregation operation. In some cases, the first carrier and the second carrier may be part of a dual-connectivity operation.

Thus, the method 2200 may provide for wireless communications. It should be noted that the method 2200 is just one implementation and that the operations of the method 2200 may be rearranged or otherwise modified such that other implementations are possible.

Figure 23:
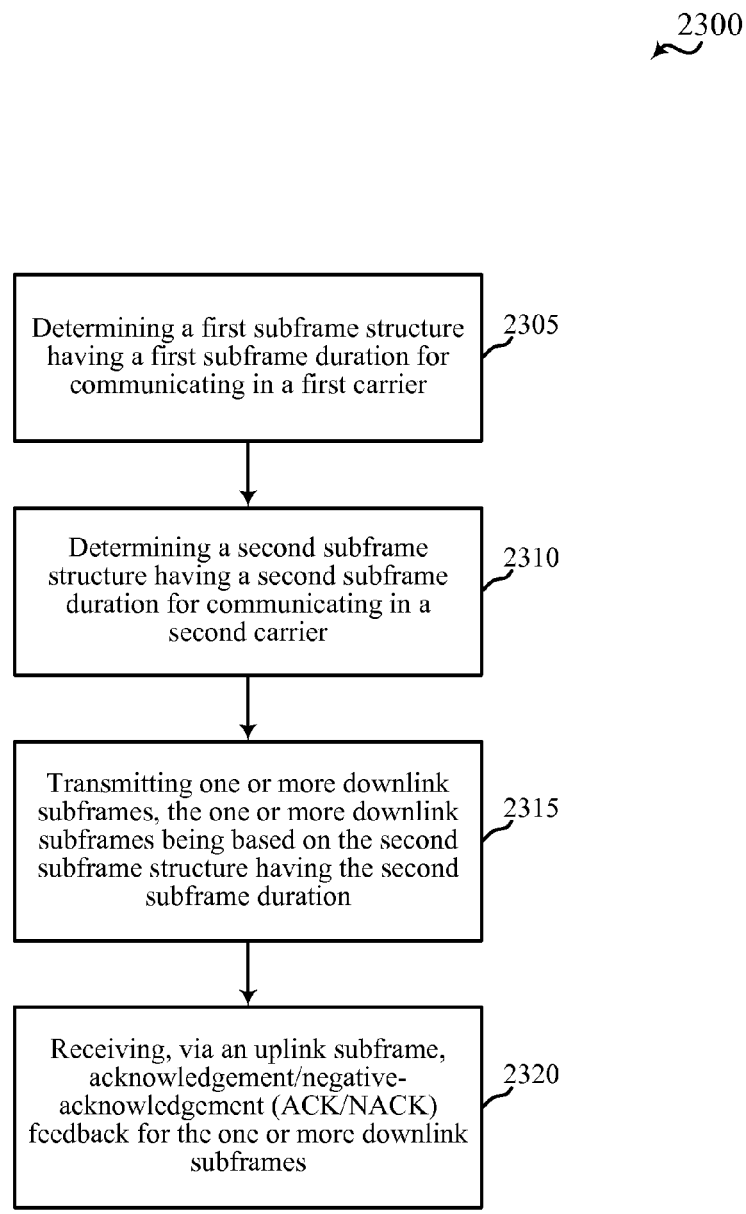
FIG. 23 is a flowchart illustrating another example of a method for wireless communications, in accordance with various aspects of the present disclosure.

FIG. 23 is a flow chart illustrating another example of a method 2300 for wireless communications, in accordance with various aspects of the present disclosure. For clarity, the method 2300 is described below with reference to aspects of one or more of the apparatuses 405 and/or 505 described with reference to FIGS. 4 and/or 5, one or more of the eNBs 105, 205, 705, and/or 905 described with reference to FIGS. 1, 2A, 2B, 7, and/or 9, and/or one or more of the UEs 115, 215, 815, and/or 915 described with reference to FIGS. 1, 2A, 2B, 8, and/or 9. In some embodiments, an apparatus, eNB, or UE, such as one of the apparatuses 405, 505, eNBs 105, 205, 705, 905, and/or UEs 115, 215, 815, 915 may execute one or more sets of codes to control the functional elements of the apparatus, eNB, or UE to perform the functions described below.

At block 2305, a first subframe structure having a first subframe duration for communicating in a first carrier may be determined. The operation(s) at block 2305 may in some cases be performed using the communication management module 415, 515, 790, 860, 941, and/or 981 described with reference to FIGS. 4, 5, 7, 8, and/or 9, and/or the first radio frequency spectrum band communication management module 525 and/or 610 described with reference to FIGS. 5 and/or 6.

At block 2310, a second subframe structure having a second subframe duration for communicating in a second carrier may be determined. The operation(s) at block 2310 may in some cases be performed using the communication management module 415, 515, 790, 860, 941, and/or 981 described with reference to FIGS. 4, 5, 7, 8, and/or 9, and/or the second radio frequency spectrum band communication management module 530 and/or 615 described with reference to FIGS. 5 and/or 6.

At block 2315, one or more downlink subframes based on the second subframe structure having the second subframe duration may be transmitted (e.g., from an eNB to a UE). The operation(s) at block 2315 may in some cases be performed using the communication management module 415, 515, 790, 860, 941, and/or 981 described with reference to FIGS. 4, 5, 7, 8, and/or 9, and/or the second radio frequency spectrum band communication management module 530 and/or 615 described with reference to FIGS. 5 and/or 6.

At block 2320, ACK/NACK feedback for the one or more downlink subframes may be received (e.g., at an eNB) via an uplink subframe. The operation(s) at block 2320 may in some cases be performed using the communication management module 415, 515, 790, 860, 941, and/or 981 described with reference to FIGS. 4, 5, 7, 8, and/or 9, and/or the ACK/NACK management module 640 described with reference to FIG. 6.

In some embodiments, the first carrier may be in an LTE/LTE-A and/or licensed radio frequency spectrum band, and the second carrier may be in an unlicensed radio frequency spectrum band, as described, for example, with reference to any of FIGS. 10-16, 17A, 17B, and/or 18.

In some embodiments, the second subframe duration may be less than the first subframe duration. For example, the first subframe duration may be a one millisecond subframe duration, and the second subframe duration may be a 0.5 millisecond subframe duration, as described, for example, with reference to any of FIGS. 10-16, 17A, 17B, and/or 18. In some cases, a number of downlink subframes may be transmitted (e.g., from an eNB to a UE) or received (e.g., at the UE from the eNB) using the second subframe structure having the second subframe duration, and a number of uplink subframes may be transmitted (e.g., from the UE to the eNB) or received (e.g., at the eNB from the UE) using the first subframe structure having the first subframe duration, with the second subframe duration being less than the first subframe duration.

In some embodiments, two or more downlink subframes based on the second subframe structure may be mapped to a single uplink subframe based on the first subframe structure for the purpose of transmitting/receiving ACK/NACK feedback, and ACK/NACK feedback for the two or more downlink subframes based on the second subframe structure may be transmitted or received in the single uplink subframe based on the first subframe structure. Examples of this are described with reference to FIGS. 11 and/or 12. In other embodiments, two or more downlink subframes based on the second subframe structure may be mapped to a single uplink subframe based on the second subframe structure for the purpose of transmitting/receiving ACK/NACK feedback, and ACK/NACK feedback for the two or more downlink subframes based on the second subframe structure may be received in the single uplink subframe based on the second subframe structure. An example of this is described with reference to FIG. 16.

The method 2300 may be performed in various contexts, such as, in a supplemental downlink mode, in a carrier aggregation mode, or in a standalone mode of operation when the second carrier is in an unlicensed radio frequency spectrum band. For example, the first carrier may be determined as a primary component carrier in an LTE/LTE-A and/or licensed radio frequency spectrum band, and the second carrier may be determined as a secondary component carrier in an unlicensed radio frequency spectrum band. In some cases, the second carrier may operate as a supplemental downlink to the primary component carrier. In some cases, the first carrier and the second carrier may be part of a carrier aggregation operation. In some cases, the first carrier and the second carrier may be part of a dual-connectivity operation.

Thus, the method 2300 may provide for wireless communications. It should be noted that the method 2300 is just one implementation and that the operations of the method 2300 may be rearranged or otherwise modified such that other implementations are possible.

In some cases, two or more of the methods 1900, 2000, 2100, 2200, and/or 2300 described with reference to FIGS. 19, 20, 21, 22, and/or 23 may be combined.

The detailed description set forth above in connection with the appended drawings describes exemplary embodiments and does not represent the only embodiments that may be implemented or that are within the scope of the claims. The terms "example" and "exemplary," when used in this description, mean "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   determining a first subframe structure having a first subframe duration for communicating in a first carrier;
   determining a second subframe structure having a second subframe duration for communicating in a second carrier, the second subframe duration being half of the first subframe duration;
   allocating resources using at least a pair of adjacent resource blocks (RBs) of the second subframe structure, the adjacent RBs of the second subframe structure equal to a single RB of the first subframe structure; and
   communicating with at least one node using at least the second subframe structure having the second subframe duration.

2. The method of claim 1, wherein the first carrier is in a licensed radio frequency spectrum band and the second carrier is in an unlicensed radio frequency spectrum band.

3. The method of claim 1, further comprising:
   transmitting a first channel in the first carrier using the first subframe duration; and
   transmitting a second channel in the second carrier using the second subframe duration.

4. The method of claim 1, further comprising:
   receiving a first channel in the first carrier using the first subframe duration; and
   receiving a second channel in the second carrier using the second subframe duration.

5. The method of claim 1, further comprising:
transmitting a channel in the second carrier, to at least one user equipment, using the second subframe duration, the second subframe duration being less than the first subframe duration.

6. The method of claim 5, further comprising:
assigning at least one of downlink resources, downlink demodulation reference signals (DL DM-RS), or channel state information reference signals (CSI-RS) of the channel to the at least one user equipment based on two or more resource blocks (RBs) of the second subframe structure.

7. The method of claim 1, further comprising:
adjusting at least one of transport block size (TBS) determination, or a sub-band size for channel state information (CSI) feedback for the second subframe structure, with respect to the first subframe structure.

8. The method of claim 1, further comprising:
using a control channel to cross schedule component carriers (CCs) from subframes based on the first subframe structure to subframes based on the second subframe structure.

9. The method of claim 1, further comprising:
performing scheduling of component carriers (CCs) of subframes having the second subframe structure using at least one of cross-subframe scheduling or multi-subframe scheduling.

10. The method of claim 1, further comprising:
receiving, via an uplink subframe, acknowledgment/non-acknowledgement (ACK/NACK) feedback for one or more downlink subframes, the one or more downlink subframes being based on the second subframe structure.

11. The method of claim 10, wherein two or more downlink subframes based on the second subframe structure are mapped to a single uplink subframe based on the first subframe structure for ACK/NACK feedback.

12. The method of claim 1, further comprising:
scheduling a plurality of subframes of the second subframe structure using a single subframe of the first subframe structure.

13. The method of claim 1, further comprising:
identifying a type of channel to be transmitted; and
transmitting the type of channel in an uplink subframe using either the first subframe duration or the second subframe duration, the subframe duration being based at least in part on the identified channel type.

14. The method of claim 1, further comprising:
receiving at least one indication of whether at least one downlink channel or at least one uplink channel will be based on the first subframe structure having the first subframe duration or the second subframe structure having the second subframe duration.

15. The method of claim 1, further comprising:
detecting a subframe duration of a downlink control channel; and
determining a subframe duration of a downlink shared channel based at least in part on the subframe duration of the downlink control channel.

16. The method of claim 1, wherein the at least one node comprises a user equipment (UE) or an evolved Node B (eNB).

17. The method of claim 1, wherein the first carrier and the second carrier are part of a carrier aggregation operation.

18. The method of claim 1, wherein the first carrier and the second carrier are part of a dual-connectivity operation.

19. An apparatus for wireless communications, comprising:
a means for determining a first subframe structure having a first subframe duration for communicating in a first carrier;
a means for determining a second subframe structure having a second subframe duration for communicating in a second carrier, the second subframe duration being half of the first subframe duration; and
a means for allocating resources using at least a pair of adjacent resource blocks (RBs) of the second subframe structure, the adjacent RBs of the second subframe structure equal to a single RB of the first subframe structure;
a means for communicating with at least one node using at least the second subframe structure having the second subframe duration.

20. The apparatus of claim 19, wherein the first carrier is in a licensed radio frequency spectrum band and the second carrier is in an unlicensed radio frequency spectrum band.

21. The apparatus of claim 19, further comprising:
a means for transmitting a channel in the second carrier, to at least one user equipment, using the second subframe duration, the second subframe duration being less than the first subframe duration.

22. An apparatus for wireless communications, comprising:
a processor;
memory in electronic communication with the processor; and
instructions stored in the memory, the instructions being executable by the processor to:
determine a first subframe structure having a first subframe duration for communicating in a first carrier;
determine a second subframe structure having a second subframe duration for communicating in a second carrier, the second subframe duration being half of the first subframe duration;
allocate resources using at least a pair of adjacent resource blocks (RBs) of the second subframe structure, the adjacent RBs of the second subframe structure equal to a single RB of the first subframe structure; and
communicate with at least one node using at least the second subframe structure having the second subframe duration.

23. The apparatus of claim 22, wherein the first carrier is in a licensed radio frequency spectrum band and the second carrier is in an unlicensed radio frequency spectrum band.

24. The apparatus of claim 22, wherein the instructions are executable by the processor to:
transmit a first channel in the first carrier using the first subframe duration; and
transmit a second channel in the second carrier using the second subframe duration.

25. The apparatus of claim 22, wherein the instructions are executable by the processor to:
receive a first channel in the first carrier using the first subframe duration; and
receive a second channel in the second carrier using the second subframe duration.

26. The apparatus of claim 22, wherein the instructions are executable by the processor to:
transmit a channel in the second carrier, to at least one user equipment, using the second subframe duration, the second subframe duration being less than the first subframe duration.

27. The apparatus of claim 26, wherein the instructions are executable by the processor to:
assign at least one of downlink resources, downlink demodulation reference signals (DL DM-RS), or channel state information reference signals (CSI-RS) of the channel to the at least one user equipment based on two or more resource blocks (RBs) of the second subframe structure.

28. A non-transitory computer-readable medium storing computer-executable code for wireless communications, the code executable by a processor to:
determine a first subframe structure having a first subframe duration for communicating in a first carrier;
determine a second subframe structure having a second subframe duration for communicating in a second carrier, the second subframe duration being half of the first subframe duration;
allocate resources using at least a pair of adjacent resource blocks (RBs) of the second subframe structure, the adjacent RBs of the second subframe structure equal to a single RB of the first subframe structure; and
communicate with at least one node using at least the second subframe structure having the second subframe duration.

* * * * *